US012658742B2

(12) United States Patent
Garvey et al.

(10) Patent No.: US 12,658,742 B2
(45) Date of Patent: Jun. 16, 2026

(54) ELECTRIC MACHINE

(71) Applicant: ROLLS-ROYCE PLC, London (GB)

(72) Inventors: Seamus D Garvey, Nottingham (GB);
Mark J Boden, Derby (GB); **Sophoclis
Patsias**, Stockport (GB)

(73) Assignee: ROLLS-ROYCE plc, London (GB)

( * ) Notice: Subject to any disclaimer, the term of this
patent is extended or adjusted under 35
U.S.C. 154(b) by 291 days.

(21) Appl. No.: 18/589,674

(22) Filed: Feb. 28, 2024

(65) Prior Publication Data

US 2024/0313589 A1 Sep. 19, 2024

(30) Foreign Application Priority Data

Mar. 17, 2023 (GB) ...................................... 2303912

(51) Int. Cl.
H02K 1/14 (2006.01)
F02C 6/20 (2006.01)
F02C 7/268 (2006.01)
H02K 7/18 (2006.01)
(Continued)

(52) U.S. Cl.
CPC .............. H02K 1/146 (2013.01); F02C 6/20
(2013.01); F02C 7/268 (2013.01); **H02K
7/1823 (2013.01); H02K 11/21** (2016.01);
H02K 11/30 (2016.01)

(58) Field of Classification Search
CPC ........ F02C 6/20; F02C 7/268; F16C 2360/23;
F16C 32/0446; F16C 32/0457; F16C
32/048; F16C 32/0497; H02K 1/146;
H02K 11/21; H02K 11/30; H02K 3/28;
H02K 7/09; H02K 7/1823; H02K 26/00;
H02K 17/12
See application file for complete search history.

(56) References Cited

U.S. PATENT DOCUMENTS

| | | |
|---|---|---|
| 2005/0077793 A1 | 4/2005 | Garvey et al. |
| 2018/0180095 A1 | 6/2018 | Jastrzebski et al. |
| 2020/0227988 A1 | 7/2020 | Zhu et al. |

FOREIGN PATENT DOCUMENTS

GB 2408390 A 5/2005

OTHER PUBLICATIONS

Aug. 9, 2024 Search Report issued in British Patent Application No.
24156983.9.

(Continued)

*Primary Examiner* — Christopher M Koehler
*Assistant Examiner* — Ethan Nguyen Vo
(74) *Attorney, Agent, or Firm* — Oliff PLC

(57) ABSTRACT

An electric machine includes a stator having a phase
arrangement, and a rotor. The phase arrangement includes
legs connected in parallel at first and second primary junc-
tions. Each leg includes a plurality of coils connected in
series through a respective intermediate junction. Each leg is
connected to at least one other leg by a branch at the
respective intermediate junctions such that the phase
arrangement is a bridge circuit. The phase arrangement
conducts a motor current through the respective coils
between the first and second primary junctions. The phase
arrangement permits an alignment current to flow between
the first and second primary junctions along an alignment
current path which passes through at least one coil of two
different legs via a respective branch. The motor currents
cause a torque to be applied to the rotor, and the alignment
current causes a translational force to be applied to the rotor.

16 Claims, 12 Drawing Sheets

(51) Int. Cl.
　　H02K 11/21　　　　(2016.01)
　　H02K 11/30　　　　(2016.01)

(56)　　　　　　References Cited

OTHER PUBLICATIONS

Aug. 12, 2024 Search Report issued in British Patent Application No. 24156984.7.

W.K.S. Khoo. "Bridge Configured Winding for Polyphase Self-Bearing Machines". IEEE Transactions on Magnetics, Apr. 2005, vol. 41, No. 4, pp. 1289-1295.

W.K.S. Khoo et al. "Practical Implementation of the Bridge Configured Winding for Producing Controllable Transverse Forces in Electrical Machines". IEEE Transactions on Magnetics, Jun. 2011, vol. 47, No. 6, pp. 1712-1718.

Jin Huang et al. "Analysis and Control of Multiphase Permanent-Magnet Bearingless Motor With a Single Set of Half-Coiled Winding". IEEE Transactions on Industrial Electronics, Jul. 2014, vol. 61, No. 7, pp. 3137-3145.

Ryohei Oishi et al. "A Novel Parallel Motor Winding Structure for Bearingless Motors". IEEE Transactions on Magnetics, May 2013, vol. 49, No. 5, pp. 2287-2290.

Akira Chiba et al. "A Principle and Test Results of a Novel Bearingless Motor With Motor Parallel Winding Structure". IEEE, 2013, pp. 2474-2479.

Sep. 20, 2023 Search Report issued in British Patent Application No. 2303912.6.

Sep. 20, 2023 Search Report issued in British Patent Application No. 2303914.2.

U.S. Appl. No. 18/589,701, filed Feb. 28, 2024 in the name of Seamus D Garvey et al.

Apr. 3, 2025 Notice of Allowance issued in U.S. Appl. No. 18/589,701.

Severson, E. et al. "Practical Implementation of Dual Purpose No Voltage Drives for Bearingless Motors." IEEE Applied Power Electronics Conference and Exposition (APEC), Mar. 15, 2015, pp. 819-826.

Ahmed, I. et al. "Bearingless Generator Design and Optimization for High-Speed Applications." IEEE Energy Conversion Congress and Exposition (ECCE), Oct. 10, 2021, pp. 4562-4569.

200B

ELECTRIC MACHINE

CROSS-REFERENCE TO RELATED APPLICATIONS

This specification is based upon and claims the benefit of priority from United Kingdom Patent Application No. 2303912.6, filed on 17 Mar. 2023, the entire contents of which are incorporated herein by reference.

TECHNICAL FIELD

This disclosure concerns an electric machine comprising a stator, a rotor configured to rotate relative to the stator and a phase arrangement. The disclosure further concerns a gas turbine engine comprising an electric machine.

BACKGROUND

In view of current industrial trends and objectives, it is desirable to incorporate a greater degree of electrical functionality on an airframe and/or on a gas turbine engine. However, various technical challenges are associated with reliably and effectively extracting electrical energy from and/or providing electrical energy to a gas turbine engine during operation. In particular, vibrational energy and/or heat energy originating from a gas turbine engine present a challenging operational environment for any electric machine which is to be coupled to a gas turbine engine for this purpose. Further, strict mass and size penalties associated with any components which are to be incorporated within a gas turbine engine present further technical challenges in the design of an electrical machine which is configured to extract electrical energy from and/or provide electrical energy to a gas turbine engine during operation. Accordingly, it is desirable to provide an improved electrical machine which is capable of better meeting these challenges.

US 2005/0077793 A1 describes a rotating electric machine comprising two major components capable of relative rotation about a common axis and separated by an air gap in which magnetic fields linking the two main components through the air gap act both to exert torque and lateral forces. A set of windings is present on at least one of these components and this set of winding is used to generate a distribution of flux having two parts: the first part serving primarily to cause torque and the second part serving to cause a net lateral force between the two main components. The machine uses the physical connection of the coils within the phases of the machine such that separate sources can be used for supplying currents for generating torque and lateral forces independently.

SUMMARY

According to a first aspect, there is provided an electric machine comprising a stator, a rotor configured to rotate relative to the stator, the stator having a phase arrangement, wherein the phase arrangement includes a number of legs connected in parallel at a first primary junction and a second primary junction, the number of legs being an integer greater than two; each leg includes a plurality of coils connected in series through a respective intermediate junction, each coil comprising a number of turns; each leg is connected to at least one other leg of the legs by a branch at the respective intermediate junctions such that the phase arrangement is in the form a bridge circuit; the phase arrangement is configured to conduct, through each leg, a motor current through the respective in series coils between the first primary junction and the second primary junction; the phase arrangement is configured to permit an alignment current to flow between the first primary junction and the second primary junction along an alignment current path which passes through at least one coil of two different legs of the number of legs via a respective branch; and the electric machine is configured so that: the motor currents cause a torque to be applied to the rotor for rotation relative to the stator, and the alignment current causes a translational force to be applied to the rotor. The number of legs may be an odd integer greater than one.

The expression "a number of legs" is intended to refer to the number of legs in the entire plurality of legs of the phase arrangement—i.e., each and every leg of the phase arrangement meeting the associated definition in the claim. The number of legs is the exhaustive total of the legs. Accordingly, although a phase arrangement having a total of six legs may be considered to comprise a subset of five legs, it is not considered to have a number of legs which is equal to five.

The alignment current path may flow via the respective branch to bypass at least one coil of each leg along which it passes. Accordingly, an alignment current which passes through one coil of two legs may flow through a proper subset of the coils on each leg (i.e., not through all coils of the leg), for example flowing through only the first-leg first coil and the second-leg second coil (via the branch), or flowing through only the second-leg first coil and the first-leg second coil (via the branch).

It may be that the phase arrangement is arranged such that an increase in the alignment current does not alter a torque which is caused to be applied to the rotor by the motor currents.

The stator may comprise a set of stator teeth, each stator tooth of the set being equally angularly distributed around a circumference of the stator, wherein a number of stator teeth within the set of stator teeth is equal to the number of legs of the phase arrangement. Also, in each leg, each coil may form part of a different stator tooth coil-grouping, with each stator tooth coil-grouping being provided to at least one stator tooth of the set of stator teeth. Further, each intermediate junction may be located such that, in each leg, a total number of turns of the or each coil connected in series between the first primary junction and the respective intermediate junction is equal to a total number of turns of the or each coil connected in series between the respective intermediate junction and the second primary junction.

It may be that each coil which forms part of a respective stator tooth coil-grouping is arranged coaxially with each other coil which forms part of the same stator tooth coil-grouping. Each coil may be defined by a characteristic distance to the centre of the stator measured from a geometrical centre of the respective coil. In each leg, a mean characteristic distance to the centre of the stator of each of the coils in the respective leg may be equal to a mean characteristic distance to the centre of the stator of each of the coils in each other leg.

Each stator tooth may comprise a soft magnetic material. Each coil-grouping may be wound around the at least one stator tooth to which it is provided.

The electric machine may further comprise a plurality of active differential current sources, each active differential current source being positioned on a respective branch and configured to inject an actively-instigated differential current into each leg connected by the respective branch, wherein the respective actively-instigated differential current forms part of an alignment current which flows between the first primary junction and the second primary junction via the respective branch. In addition, the electric machine may also comprise a sensor arrangement and a controller. The sensor arrangement may be configured to monitor a translational position of the rotor with respect to the stator and monitor a rotational speed of the rotor. The controller may be configured to: determine a magnitude and a direction of a force required to maintain alignment of the rotor with respect to the stator based on the monitored translational position of the rotor, the monitored rotational speed of the rotor and a magnitude of the motor currents; and regulate a magnitude of the active differential current injected by each of the plurality of active differential current sources based on the determined magnitude and direction of the force.

It may be that the electric machine further comprises a plurality of negative impedance converters, each positioned on a respective branch, wherein each alignment current path has a positive electrical impedance provided by the coils of each leg; and each negative impedance converter is configured to add a negative electrical impedance to one of the alignment current paths by introducing additional electrical energy into the alignment current path.

It may be that the electric machine further comprises an input system configured to provide an alternating-current voltage to the phase arrangement.

If present, the set of stator teeth may be one of a plurality of sets of stator teeth, each set of stator teeth being radially offset with respect to each other around the rotor, and the phase arrangement may be one of a plurality of phase arrangements, each phase arrangement being provided to a respective set of stator teeth. The electric machine may further comprise an input system configured to provide a respective alternating-current voltage to each phase arrangement, each alternating-current voltage having a different phase.

According to a second aspect there is provided a gas turbine engine comprising the electric machine according to the first aspect, wherein the rotor of the electric machine is mechanically coupled to a spool of the gas turbine engine. The rotor of the electric machine may be arranged coaxially with the spool of the gas turbine engine. The electric machine may be disposed within a core of the gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
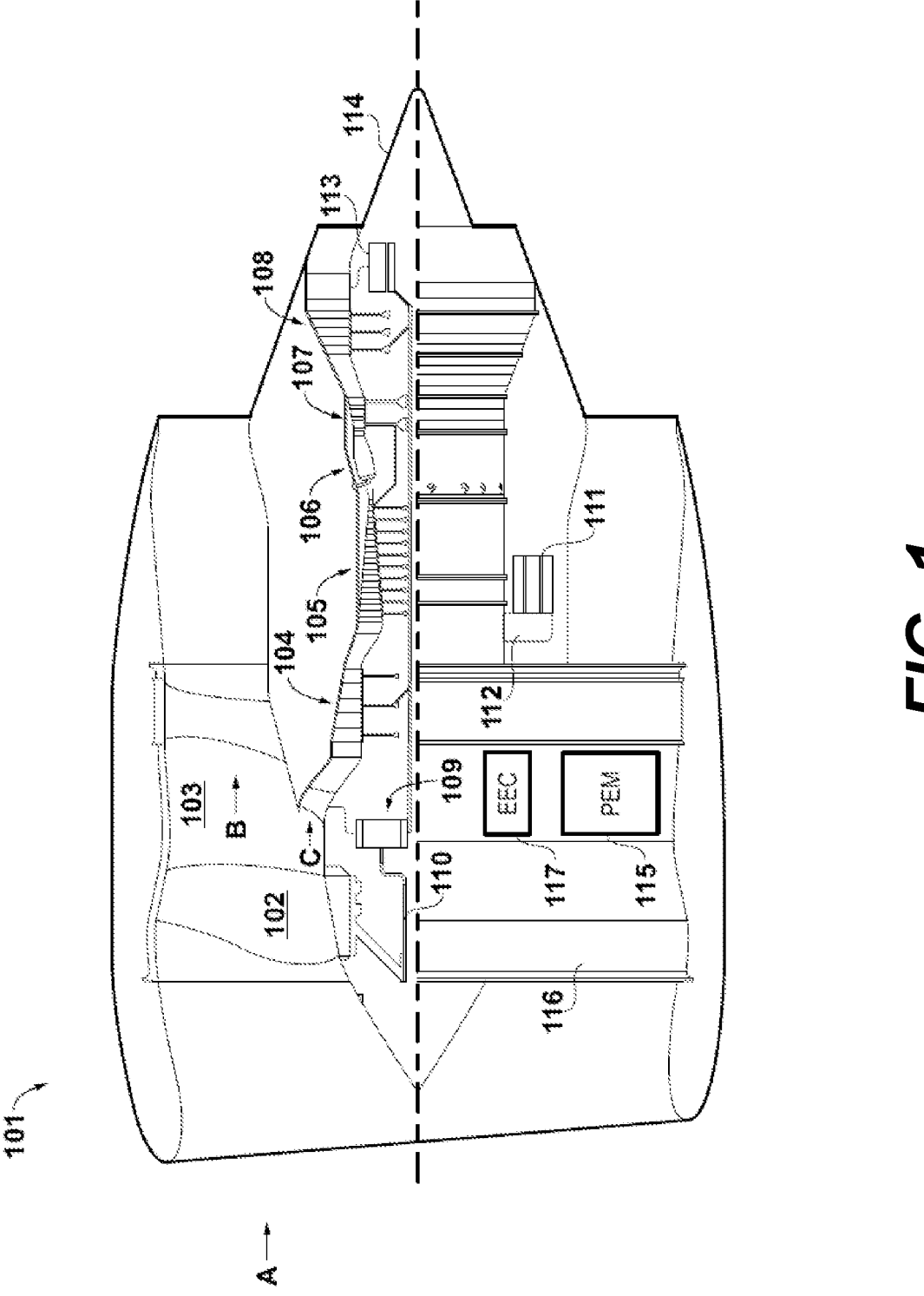
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas 10 turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high-pressure spool and a second rotary electric machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more DC busses. The DC busses allow for the distribution of electrical power to other engine electrical loads and to electrical loads on the airframe. The DC busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

Figure 2A:
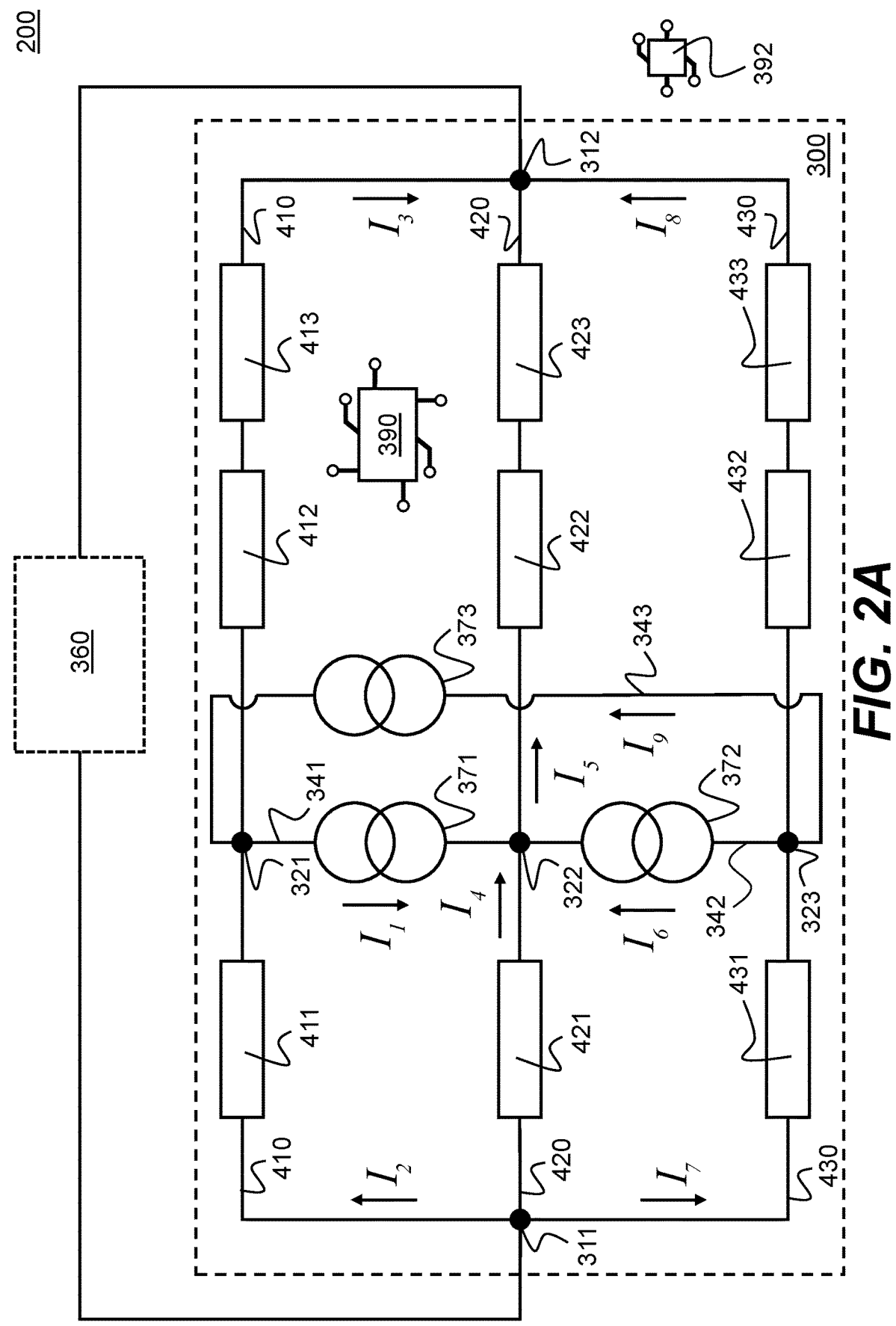
FIG. 2A is circuit diagram which shows an example electrical topology of a first example electric machine.
Figure 2B:
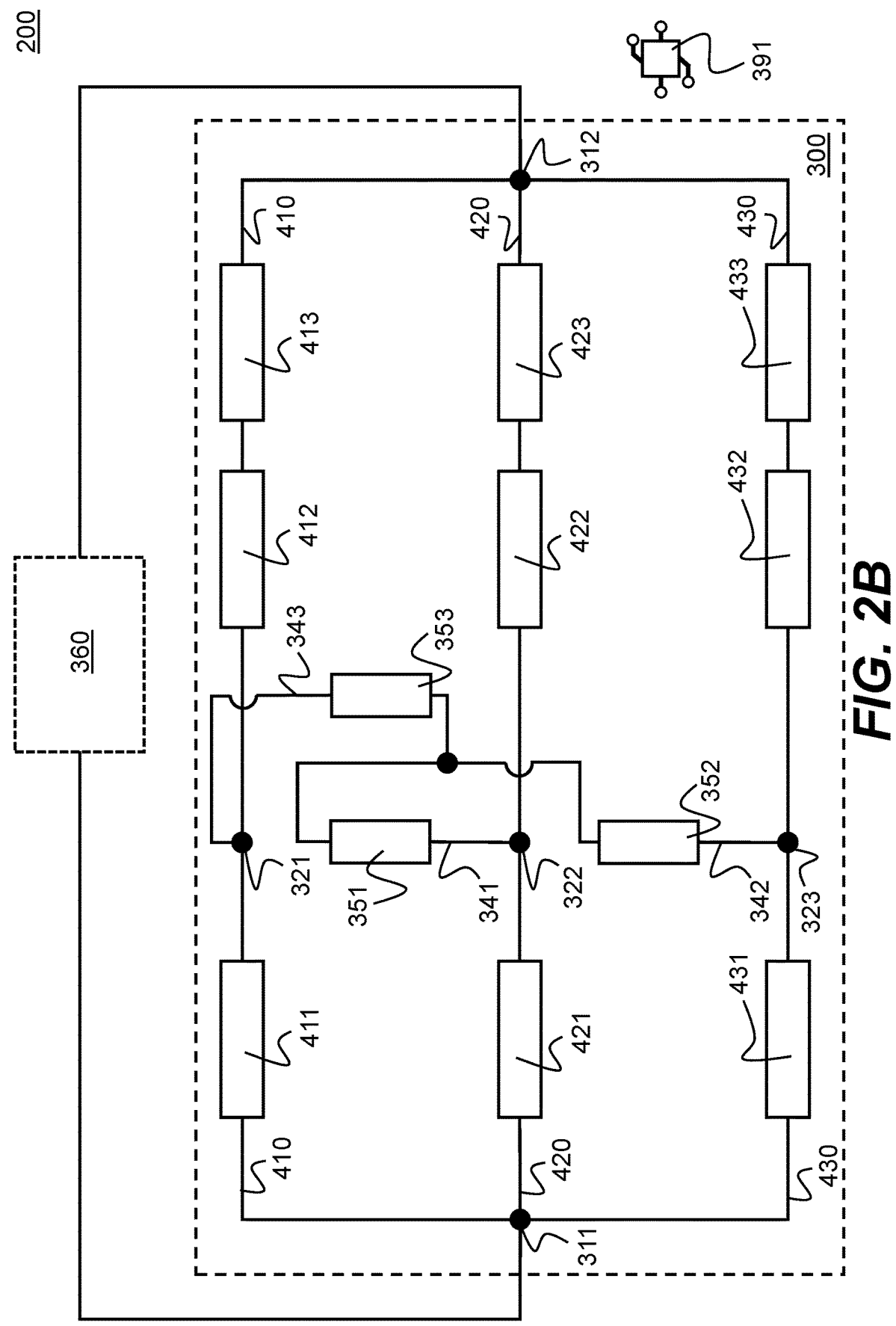
FIG. 2B is a circuit diagram which shows an alternative example electrical topology of the first example electric machine
Figure 3:
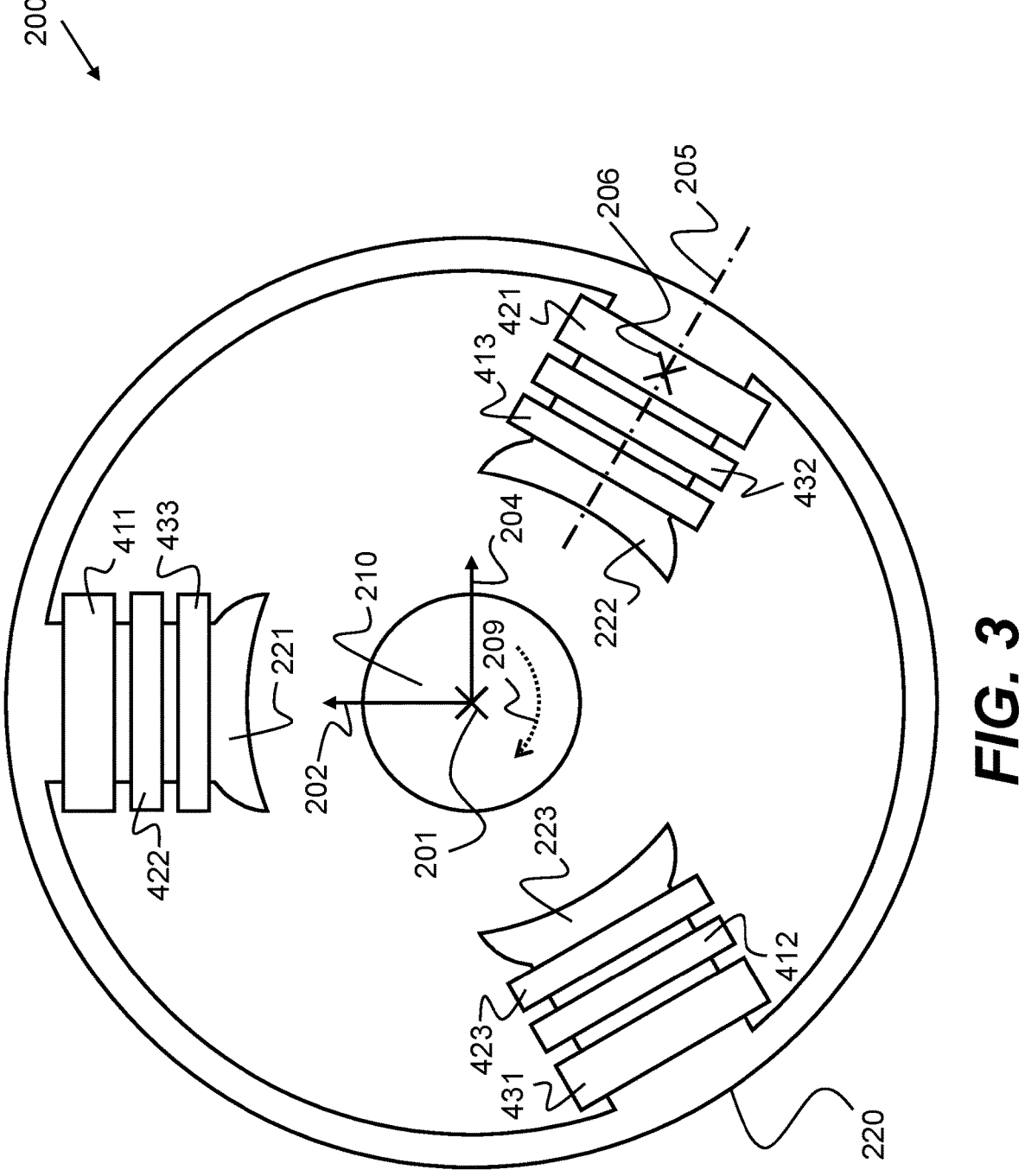
FIG. 3 shows a cross-sectional view of the first example electric machine.

FIGS. 2A and 2B are circuit diagrams which show respective example electrical topologies of a first example rotary electric machine 200. FIG. 3 shows a schematic cross-sectional view of the first example rotary electric machine 200. Components of the electric machine will be described with reference to both FIGS. 2 and 3.

As shown in FIG. 3, the electric machine 200 includes a rotor 210 and a stator 220. In use, the rotor 210 rotates relative to the stator 220 about a central axis 201 of the rotor as indicated by arrow 209, while the stator 220 is static (i.e., has a fixed local angular position about the central axis 201). During operation, the electric machine 200 may function as a motor, in which case the rotor 210 may be mechanically coupled to a mechanical system such that the rotor 210 drives the mechanical system in use. The mechanical system provides a mechanical load and may otherwise be referred to as a mechanical load. Conversely, during operation, the electric machine 200 may function as a generator, in which case the rotor 210 may be mechanically coupled to a mechanical system such that the mechanical system drives the rotor 210 in use. In particular, the rotor 210 may be mechanically coupled to a spool of a gas turbine engine, such that the spool of the gas turbine engine may be driven by the rotor 210 and/or may drive the rotor 210 as a mechanical system in use. As discussed above with reference to FIG. 1, this arrangement enables the generation of electrical power while the gas turbine engine is running, the driving of the spool to start of the engine instead of, for instance, an air turbine starter and/or the facilitation of mechanical power transfer between different spools to improve operability, fuel consumption and the like. Further, the rotor 210 of the electric machine 200 may be arranged coaxially with the spool of the gas turbine engine (or coaxially with the turbomachinery of the gas turbine engine). This enables the electric machine 200 to be advantageously disposed within a core of the gas turbine engine, which provides a compact and simple arrangement for integrating the electric machine 200 within a gas turbine engine.

The stator 210 comprises a first stator tooth 221, a second stator tooth 222 and a third stator tooth 223, which together form a set of stator teeth. The number of stator teeth within the set of stator teeth is therefore 3, this number being the exhaustive total of teeth belonging to the stator (i.e., each and every tooth of the stator). The first stator tooth 221, the second stator tooth 222 and the third stator tooth 223 are equally angularly distributed around a circumference of the stator 220 (and therefore are equally angularly distributed around the rotor 210). Because the number of stator teeth within the set of stator teeth is three, the stator teeth being equally radially offset with respect to each other around the rotor 210 requires that each tooth be angularly offset to each adjacent tooth by approximately 120°. Accordingly, the electric machine 200 has a rotational symmetry around the centre of the stator 220 of three. Each stator tooth 221, 222, 223 is configured to support a magnetic field, and to this end may comprise a soft magnetic material (that is, a material having an intrinsic coercivity no greater than, for example, 1000 A/m). The electric machine 200 comprises a phase arrangement 300 provided to the stator 220. The phase arrangement 300 may also be referred to as a coil arrangement 300 or as a phase coil arrangement 300. The phase arrangement 300 is associated with a single phase of AC power received from an input system 360 (e.g., a single phase of an AC input voltage received from the input system 360). The phase arrangement 300 includes a number of legs 410, 420, 430, wherein the number of legs includes a first leg 410, a second leg 420 and a third leg 430 such that the number of legs of the phase arrangement 300 is equal to the number of stator teeth within the set of stator teeth 221, 222, 223. The first leg 410, the second leg 420 and the third leg 430 are connected in parallel at a first primary junction 311 and a second primary junction 312. Each leg 410, 420, 430 includes a plurality of coils connected in series through a respective intermediate junction 321, 322, 323 as discussed in further detail below. Each coil is formed of an electrically conductive material which is suitable for being wound around (or within) a magnetic material. Further, each coil has a number of turns, the number of turns being a number of times around a magnetic material (e.g., the respective stator tooth) which the electrically conducting material from which the coil is formed is to be wound.

The first leg 410 includes a first-leg first coil 411, a first-leg second coil 412 and a first-leg third coil 413, whereas the second leg 420 includes a second-leg first coil 421, a second-leg second coil 422 and a second-leg third coil 423 and the third leg 430 includes a third-leg first coil 431, a third-leg second coil 432 and a third-leg third coil 433. Each of the first-leg coils 411, 412, 413 are connected in series through a first intermediate junction 321. Similarly, each of the second-leg coils 421, 422, 423 are connected in series through a second intermediate junction 322 and each of the third-leg coils 431, 432, 433 are connected in series through a third intermediate junction 323. A first branch 341 connects the first intermediate junction 321 and the second intermediate junction 322, a second branch 342 connects the second intermediate junction 322 and the third intermediate junction 323 while a third branch 343 connects the third intermediate junction 323 and the first intermediate junction 321. In other implementations, one or more branches may be omitted, provided that each intermediate junction is connected to at least one other intermediate junction.

In the first example electric machine 200, each coil of the phase arrangement 300 is provided to the stator 220 as follows. The first-leg first coil 411, the second-leg second coil 422 and the third-leg third coil 433 each form a part of a first stator tooth coil-grouping. Likewise, the first-leg third coil 413, the second-leg first coil 421 and the third-leg second coil 432 each form a part of a second stator tooth coil-grouping. Finally, the first-leg second coil 412, the second-leg third coil 423 and the third-leg first coil 431 each form a part of a third stator tooth coil-grouping.

In the example of FIG. 3, the first stator tooth coil-grouping is provided to (e.g., wound around) the first stator tooth 221, the second stator tooth coil-grouping is provided to the second stator tooth 222 and the third stator tooth coil-grouping is provided to the third stator tooth 223. Therefore, each stator tooth coil-grouping is provided to a single stator tooth. However, this disclosure envisages that each stator tooth coil-grouping may be provided to (e.g., span across) a plurality of stator teeth, in which case the number of teeth within the set of stator teeth may be greater than the number of legs of the phase arrangement.

Figure 4:
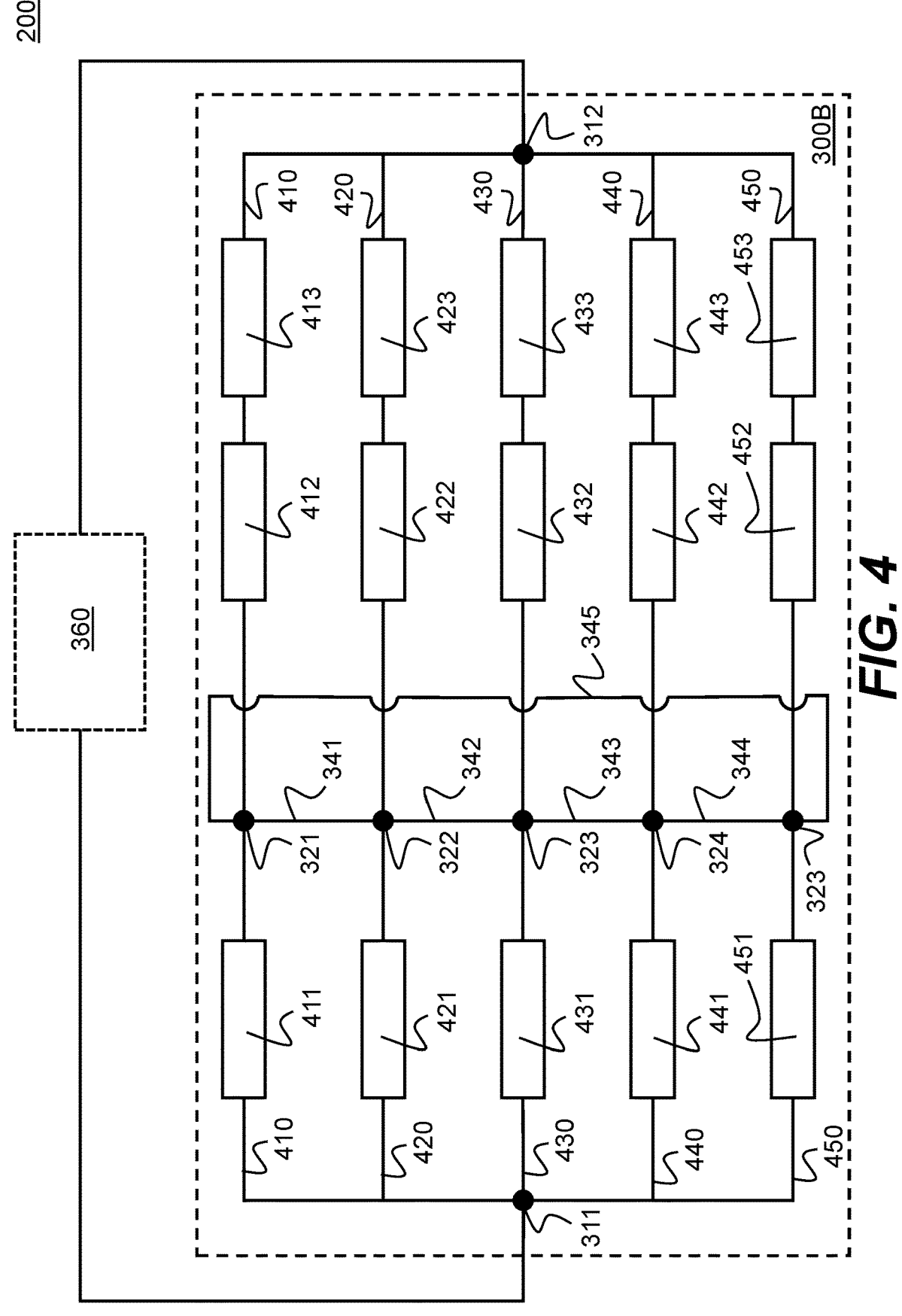
FIG. 4 is a circuit diagram which shows an electrical topology of a second example electric machine.
Figure 5:
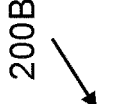
FIG. 5 shows a cross-sectional view of the second example electric machine.

FIG. 4 is a circuit diagram which shows an electrical topology of a second example rotary electric machine 200B. FIG. 5 shows a schematic cross-sectional view of the second example rotary electric machine 200B. The second example electric machine 200B is generally similar to the first example electric machine 200, with like reference numerals indicating common or similar features.

However, in addition to the first stator tooth 221, the second stator tooth 222, the third stator tooth 223, the stator 220 of the second example electric machine 200B also comprises a fourth stator tooth 224 and a fifth stator tooth 225, each of which together form the set of stator teeth of the second example electric machine 200B. As a result, the number of stator teeth within the set of stator teeth is five. The first stator tooth 221, the second stator tooth 222, the third stator tooth 223, the fourth stator tooth 224 and the fifth stator tooth 225 are equally angularly offset with respect to each other around the rotor 210. Because the number of stator teeth within the set of stator teeth is five, the stator teeth being equally angularly offset with respect to each other around the rotor 210 requires that each tooth be angularly offset to each adjacent tooth by approximately 72°. Accordingly, the electric machine 200B has a rotational symmetry around the centre of the stator 220 of five. Like in the phase arrangement 200 of the first example electric machine 200, the number of legs within the phase arrangement 300B of the second example electric machine 200B is equal to the number of stator teeth within the set of stator teeth 221-225. Therefore, the phase arrangement 300B includes the first leg 410, the second leg 420, the third leg 430 as well as a fourth leg 440 and a fifth leg 450.

The fourth leg 440 includes a fourth-leg first coil 441, a fourth-leg second coil 442 and a fourth-leg third coil 443, the fifth leg 420 includes a fifth-leg first coil 451, a fifth-leg second coil 452 and a fifth-leg third coil 453. Each of the fourth-leg coils 441, 442, 443 are connected in series through a fourth intermediate junction 324. Similarly, each of the fifth-leg coils 451, 452, 453 are connected in series through a fifth intermediate junction 325. In the second electric machine 200B, the third branch 343 connects the third intermediate junction 323 and the fourth intermediate junction 324, a fourth branch 344 connects the fourth intermediate junction 324 and the fifth intermediate junction 325 while a fifth branch 345 connects the fifth intermediate junction 325 and the first intermediate junction 321. As above, in other implementations, one or more branches may be omitted, provided that each intermediate junction is in communication with at least one other intermediate junction to permit current flow between all of the intermediate junctions.

In the second example electric machine 200B, each coil of the phase arrangement 300B is provided to the stator 220 as follows. The first-leg first coil 411, the second-leg second coil 422 and the third-leg third coil 433 form a part of a first stator tooth coil-grouping. The fourth-leg third coil 443, the second-leg first coil 421 and the third-leg second coil 432 form a part of a second stator tooth coil-grouping. Further, the third-leg first coil 431, the fourth-leg second coil 442 and the fifth-leg third coil 453 form a part of a third stator tooth grouping. The first-leg third coil 413, the fifth-leg second coil 452 and the fourth-leg first coil 441 form a part of a fourth stator tooth coil-grouping. Finally, the first-leg second coil 412, the second-leg third coil 423 and the fifth-leg first coil 451 form a part of a fifth stator tooth coil-grouping.

In the example of FIGS. 4 and 5, the first stator tooth coil-grouping is provided to (e.g., wound around) the first stator tooth 221, the second stator tooth coil-grouping is provided to the second stator tooth 222, the third stator tooth coil-grouping is provided to the third stator tooth 223, the fourth stator tooth coil-grouping is provided to the fourth stator tooth 224 and the fifth stator tooth coil-grouping is provided to the fifth stator tooth 225. Therefore, each stator tooth coil-grouping is provided to a single stator tooth. However, this disclosure envisages that each stator tooth coil-grouping may be provided to (e.g., span across) a plurality of stator teeth, in which case the number of teeth within the set of stator teeth may be greater than the number of legs of the phase arrangement.

Figure 6A:
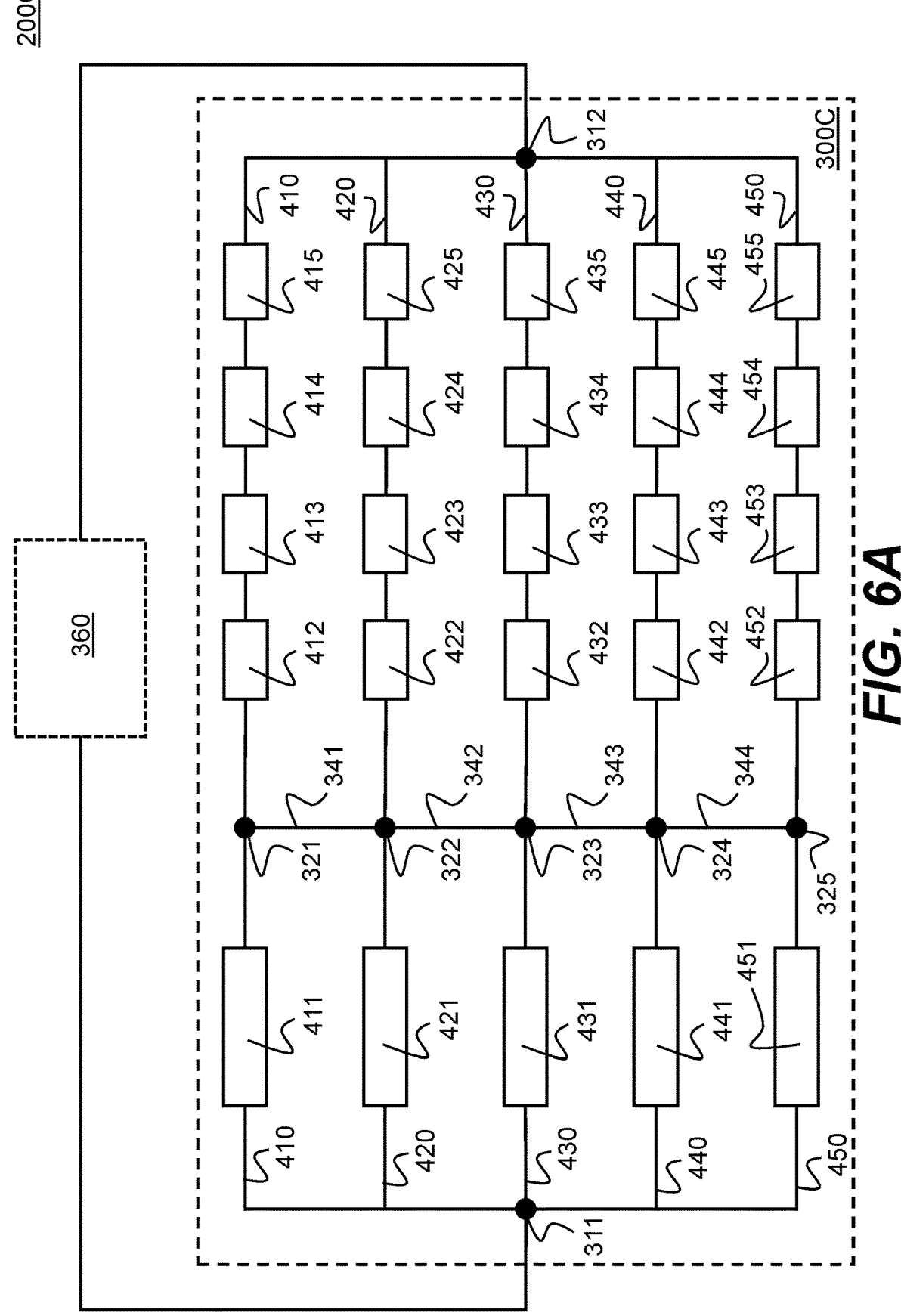
FIG. 6A is a circuit diagram which shows an example electrical topology of a third example electric machine.
Figure 6B:
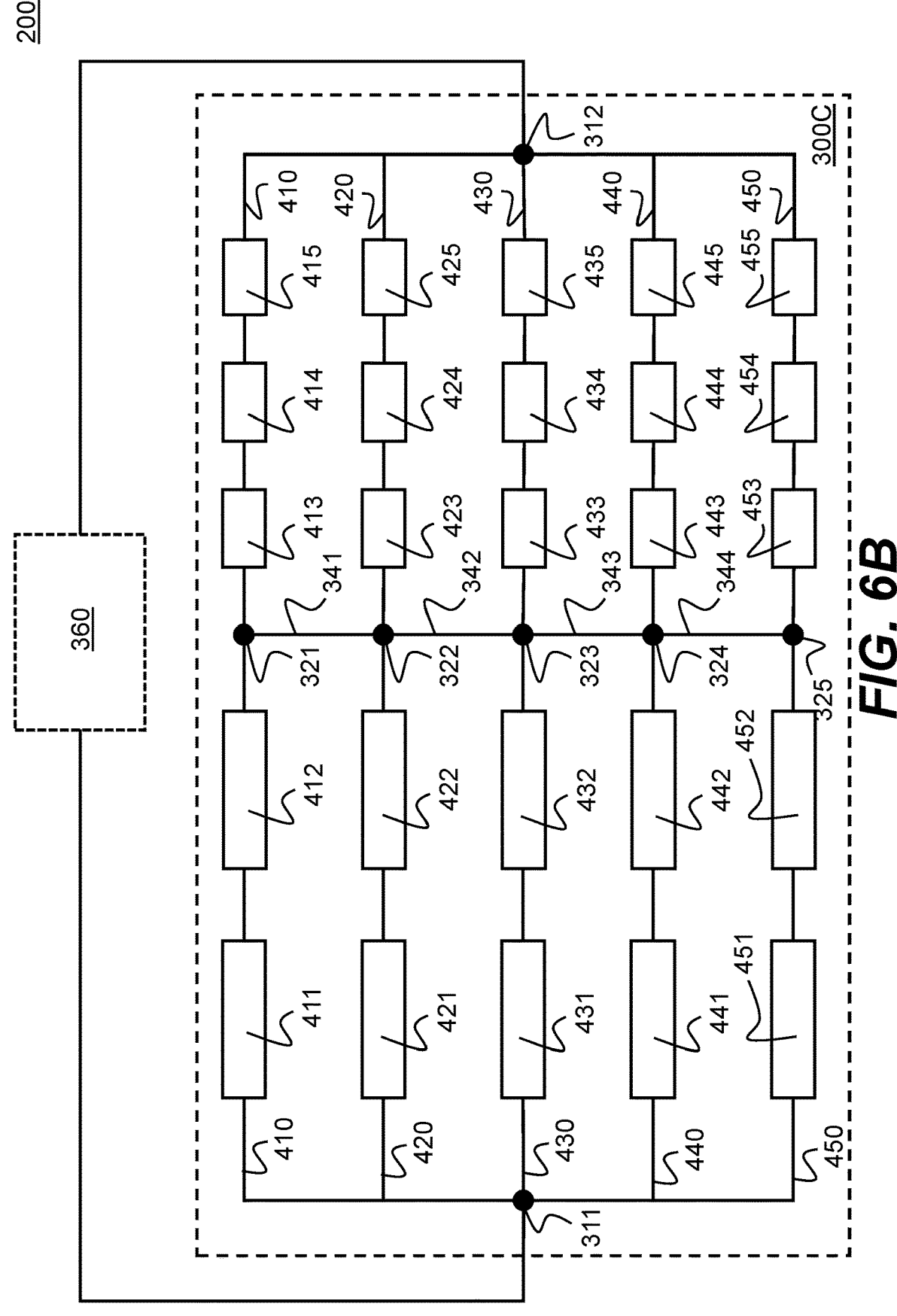
FIG. 6B is a circuit diagram which shows an alternative example electrical topology of the third example electric machine.
Figure 7:
FIG. 7 shows a cross-sectional view of the third example electric machine.

FIGS. 6A and 6B are circuit diagrams which show respective example electrical topologies of a third example rotary electric machine 200C. FIG. 7 shows a schematic cross-sectional view of the third example rotary electric machine 200C. The third example electric machine 200C is generally similar to the second example electric machine 200B, with like reference numerals indicating common or similar features. However, in the third example electric machine 200C, each leg 410-450 of the phase arrangement 300C further includes a fourth coil (respectively, 414, 424, 434, 444, 454) and a fifth coil (respectively 415, 425, 435, 445, 455). Each of the plurality of coils of each leg 410-450 are connected in series through the respective intermediate junctions. However, in the first example electrical topology of the third electrical machine 200C shown by FIG. 6A, each intermediate junction on each leg is located between the first coil of the respective leg (411, 421, 431, 441, 451) and second coil of the respective leg (412, 422, 432, 442, 452). In contrast, in the second example electrical topology of the third electrical machine 200C shown by FIG. 6B, each intermediate junction on each leg is located between the respective second coil (412, 422, 432, 442, 452) and the respective third coil (413, 423, 433, 443, 453).

In the third example electric machine 200C, each coil of the phase arrangement 300C is provided to the stator 220 as follows. The first-leg first coil 411, the second-leg second coil 422 and the third-leg third coil 433, the fourth-leg fourth coil 444 and the fifth-leg fifth coil 455 form a part of a first stator tooth coil-grouping. The first-leg second coil 412, the second-leg first coil 421, the third-leg fourth coil 434, the fourth-leg fifth coil 445 and the fifth-leg third coil 453 form a part of a second stator tooth coil-grouping. Further, the first-leg fifth coil 415, the second-leg third coil 423, the third-leg first coil 431, the fourth-leg second coil 442 and the fifth-leg fourth coil 454 form a part of a third stator tooth coil-grouping. The first-leg third coil 413, the second-leg fourth coil 424, the third-leg fifth coil 435, the fourth-leg first coil 441 and the fifth-leg second coil 452 form a part of a fourth stator tooth coil-grouping. Finally, the first-leg fourth coil 414, the second-leg fifth coil 425, the third-leg second coil 432, the fourth-leg third coil 443 and the fifth-leg first coil 451 form a part of a fifth stator tooth coil-grouping.

In the example of FIGS. 6A and 6B, the first stator tooth coil-grouping is provided to (e.g., wound around) the first stator tooth 221, the second stator tooth coil-grouping is provided to the second stator tooth 222, the third stator tooth coil-grouping is provided to the third stator tooth 223, the fourth stator tooth coil-grouping is provided to the fourth stator tooth 224 and the fifth stator tooth coil-grouping is provided to the fifth stator tooth 225. Therefore, each stator tooth coil-grouping is provided to a single stator tooth. However, this disclosure envisages that each stator tooth coil-grouping may be provided to (e.g., span across) a plurality of stator teeth, in which case the number of teeth within the set of stator teeth may be greater than the number of legs of the phase arrangement.

To summarise, in each of the example electric machines 200, 200B, 200C described above with respect to FIGS. 2-7, each coil in each leg forms part of a different stator tooth coil-grouping. In addition, each coil which forms part of a respective stator tooth coil-grouping is arranged coaxially with each other coil which forms part of the same stator tooth coil-grouping (i.e., coaxial with respect to a local radial axis 205 extending through the respective coil).

Also, each leg is connected to the other legs by a branch at the respective intermediate junctions such that each phase arrangement 300, 300B, 300C is in the general form of a bridge circuit (e.g., a Wheatstone bridge circuit). The legs 410, 420, 430, 440, 450 may be referred to as parallel paths or parallel branches in the context of the bridge circuit, as will be appreciated by those skilled in the art. Moreover, in each of the example electric machines described above, the number of legs within the phase arrangement 300, 300B, 300C is an odd integer greater than one, with the number of stator teeth in the set of stator teeth 221-225 being equal to the number of legs within the or each phase arrangement 300, 300B, 300C. Consequently, each of the example electric machines 200, 200B, 200C of the present disclosure have a rotational symmetry about the centre of the stator 220 which is an odd integer greater than one (that is, an odd rotational symmetry greater than one).

Although the principles described herein may advantageously be applied to electric machines having a number of legs with within the phase arrangement 300, 300B, 300C which is an odd integer greater than one (e.g., electric machines having an odd rotational symmetry), the principles described herein may be more generally applied to electric machines having a number of legs within the phase arrangement 300, 300B, 300C which is an integer greater than two (including both odd and even integers). Consequently, other example electric machines 200, 200B, 200C in accordance with the present disclosure may have a rotational symmetry about the centre of the stator 220 which is an integer greater than two (that is, an odd rotational symmetry greater than one or an even rotational symmetry greater than two).

Other electric machines may be constructed which have each of the above features shared by the example electric machines 200, 200B, 200C, as will be apparent to those skilled in the art in view of the above-described examples and the principles outlined above. For instance, electric machines having a rotational symmetry of, for instance, 4, 7, 6, 8 or 9 may be constructed in accordance with the present disclosure. The ability to construct electric machines having an odd rotational symmetry or an even rotational symmetry greater than two enables a wider range of rotor pole and stator tooth arrangements to be employed, which may in turn allow a mass or a size of the electric machine to be reduced depending on the particular objectives and constraints of the technical application of the electric machine. For instance, it may be that the technical application of the electric machine requires the rotor 210 to rotate at a rotational speed which lies within an optimal range of rotational speeds. The optimal range of rotational speeds may dictate that a rotor pole and stator tooth arrangement having an odd rotational symmetry or an even rotational symmetry greater than two is desirable. Such arrangements are facilitated by the example electric machines described herein.

Each of the example electric machines 200, 200B, 200C also includes an input system 360 which is electrically connected to the first primary junction 311 and the second primary junction 312 and is configured to provide a single phase of an alternating-current (AC) input voltage to the primary junctions 311, 312 of the phase arrangement 300. Accordingly, the phase arrangement 300 is associated with only a single phase of an AC input voltage. In accordance with the present disclosure, an electric machine can comprise a plurality of such phase arrangements, with each phase arrangement being associated with a respective phase of an AC input voltage (see the description of FIG. 9 below). Each of the coils is generally configured to generate a magnetic field when an electric current is conducted therethrough. The rotor 210 comprises an arrangement of rotor poles (i.e., magnetic regions) which are responsive to the magnetic field produced by the coils. Appropriate types and arrangements of rotor poles within the rotor 210 will be known to those skilled in the art and may include either or both permanent magnets and electromagnets. The rotor 210 may be a soft magnetic salient type of rotor or an induction-based type of rotor such as a squirrel cage rotor.

In particular, the rotor poles of the rotor 210 are responsive to a motor component of the magnetic field produced by the coils of the phase arrangement such that a torque is applied to the rotor 210 by the motor component of the magnetic field generated by the coils when magnetised. The motor component of the magnetic field is generated as a result of magnetising motor currents which flow in parallel through the respective legs of the phase arrangement 300, 300B, 300C between the first primary junction 311 and the second primary junction 312. The motor currents are specifically defined as the average conventional currents which flow in parallel through the legs of the phase arrangement 300, 300B, 300C between the first primary junction 311 and the second primary junction 312, respectively. The electric machine 200, 200B, 200C is arranged so that the motor currents passing through each leg of the phase arrangement 300, 300B, 300C cause a torque to be applied to the rotor 210 for rotation relative to the stator 220 by means of the motor component of the magnetic field produced by the coils as a consequence of the motor currents flowing therethrough. However, the motor currents balance each other and so do not cause any translational force to be applied to the rotor 210. The motor currents in each leg generally balance each other owing to the similar configuration of the legs.

The phase arrangement 300, 300B, 300C is also configured to permit an alignment current to flow between the first primary junction 311 and the second primary junction 312 through an alignment current path which passes through at least one coil of two different legs of the plurality of legs via at least one branch of the plurality of branches (e.g., to bypass at least one coil of each respective leg through which it flows, for example by flowing through only the or each coil on only one side of the respective intermediate junction). For example, along a path between the first intermediate junction 321 and the second primary junction 312, each alignment current is superimposed on to any motor current which is already flowing through the first leg from the first primary junction 311 to the second primary junction 312. When the alignment current flows through the alignment current path, an alignment component of the magnetic field is generated in addition to the motor component of the magnetic field as previously described. The magnetic field generated by the coils may therefore be considered to comprise both the motor component and the alignment component when an alignment current is flowing along the alignment current path. The rotor poles of the rotor 210 are responsive to the alignment component of the magnetic field produced by the coils such that a translational force is applied to the rotor 210 by the alignment component of the magnetic field generated by the coils. The translational force applied to the rotor 210 by the alignment component of the magnetic field may be referred to as unbalanced magnetic pull (UMP). Each of the example electric machines 200,

200B, 200C enable the application of UMP to electric machines having an odd rotational symmetry or to electric machines having an even rotational symmetry greater than two.

In each of the phase arrangements 300, 300B, 300C shown in FIGS. 2A-2B, 4 and 6A-6B, there are a plurality of alignment current paths which pass through at least one coil of two different legs of the plurality of legs via at least one branch of the plurality of branches. For example, in the example electrical topologies of the first example electric machine 200 shown by FIGS. 2A and 2B, there is a total of six alignment current paths extending between the first primary junction 311 and the second primary junction 312 as defined according to the above criteria. These include: a first alignment current path via the first-leg first coil 411 and the second-leg second 422 and third coils 423, a second alignment current path via the first-leg first coil 411 and the third-leg second 432 and third coils 433, a third alignment current path via the second-leg first coil 421 and the first-leg second 412 and third coils 413, a fourth alignment current path via the second-leg first coil 421 and the third-leg second 432 and third coils 433, a fifth alignment current path via the third-leg first coil 431 and the second-leg second 422 and third coils 423, and a sixth alignment current path via the third-leg first coil 431 and the first-leg second 412 and third coils 413. The electrical topologies of the respective electrical machines 200B, 200C shown in FIGS. 4 and 6A-6B correspondingly each comprise a number of alignment current paths greater than six.

In each of the example electrical topologies shown in FIGS. 2A and 2B, the second alignment current path may either extend from the first primary junction 311 to the second primary junction 312 via the first-leg first coil 411, the third branch 343 and the third-leg second 432 and third coils 433 or via the first-leg first coil 411, the first branch 341, the second branch 342 as well as the third-leg second 432 and third coils 433. While the third branch 343 provides a more direct route between the respective primary junctions 311, 312 for the second alignment current path, it will be appreciated that in some examples, the third branch 343 may not be present and the second alignment current path is provided by the first branch 341 and the second branch 343 (see FIG. 8). In other words, the number of branches does not need to be equal to the number of legs. However, as generally applied to each of the electrical topologies shown by FIGS. 2, 4 and 6A-6B, the number of branches must be at least one fewer than the number of legs in order for the phase arrangement 300, 300B, 300C to contain all of the possible alignment current paths for each topology. To illustrate this principle, only four branches 341-344 are shown in FIGS. 6A-6B, with a possible fifth branch 345 (as shown in FIG. 4) being omitted.

The interaction between the rotor poles of the rotor 210 and the motor component of the magnetic field produced by the coils is not adversely affected by the presence of the alignment component of the magnetic field, such that the alignment current does not cause any significant alteration in the torque (e.g., no first order alteration in the torque) which is caused to be applied to the rotor 210 as a result of the motor currents flowing between the primary junctions 311, 312. In particular, no substantial torque is caused to be applied to the rotor 210 as a result of the alignment current flowing along the branch 341. The origin of the alignment current is described in further detail below.

The alignment current flowing along each alignment current path during operation may comprise a differential current which is passively-instigated as follows. The electrical impedance of each coil of the phase arrangement 300, 300B, 300C is dependent on the electrical characteristics of each coil as well as the proximity of the rotor poles of the rotor 210 to the respective coil when the latter is magnetised, as will be apparent to those skilled in the art. The electrical characteristics of each coil include the number of turns of the respective coil. References herein to the concept of electrical impedance should be understood as including either or both electrical resistance and electrical reactance (i.e., inductance and/or capacitance) unless indicated otherwise. Each coil of the phase arrangement 300, 300B, 300C may be defined by a characteristic distance to the centre of the stator 220 as measured from a geometrical centre 206 of the respective coil. The geometrical centre 206 of each coil is representative of the proximity of the rotor poles of the rotor 210 to the respective coil when the central axis 201 of the rotor 210 is aligned with a centre of the stator 220. Consequently, the characteristic distance is directly related to the electrical impedance of the respective coils when the rotor 210 is in alignment with the stator 220 and when the respective coil is magnetised with an electrical current. The electrical characteristics and the characteristic distance to the centre of the stator 200 of each coil are chosen such that when the rotor 210 is aligned with respect to the stator 220 (i.e., when the central axis 201 of the rotor 210 is aligned with a centre of the stator 220), the impedance of each of the coils is equal and the bridge circuit is therefore balanced. Because the bridge circuit is balanced, no potential difference between the intermediate junctions exists and so no electric current passively flows along any of the branches.

If the rotor 210 is translationally displaced or perturbed away from the centre of the stator 220 and towards either the first tooth 221 (and away from the second tooth 222 and the third tooth 223), towards the second tooth 222 (and away from the first tooth 221 and the third tooth 223) or towards the third tooth 223 (and away from the first tooth 221 and the second tooth 222), the impedance of each of the coils of the phase arrangement 300 varies accordingly. Accordingly, the bridge circuit is no longer balanced and a potential difference between at least one pair of intermediate junctions arises which passively instigates a differential current to flow along at least one of the branches between the respective intermediate junctions. Depending on the direction in which the central axis 201 of the rotor 210 is translated away from the centre of the stator 220, the passively-instigated differential current may flow between each intermediate junction connected by a respective branch in different directions.

For instance, if the bridge circuit is no longer balanced such that the potential difference at the first intermediate junction 321 is higher than the potential difference at the second intermediate junction 322 while the potential difference at the third intermediate junction 323 is higher than the potential difference at the second intermediate junction 322, a positive differential current (that is, a conventional current) is passively-instigated to flow from the first intermediate junction 321 to the second intermediate junction 322 (labelled as $I_1$ in FIG. 2A) while another positive differential current is passively-instigated to flow from the third intermediate junction 323 to the second intermediate junction 322 (labelled as $I_6$ in FIG. 2A). If the potential difference at the third intermediate junction 323 is higher that the potential difference at the first intermediate junction 321, a further positive differential current is passively-instigated to flow from the third intermediate junction 323 to the first intermediate junction 321 (labelled as $I_9$ in FIG. 2A). However, for ease of explanation, this possibility is not considered in the following description. Nevertheless, those skilled in the art will understand how this further positive differential current, $I_9$, interacts with the other currents described herein in view of the following description of the same. The conventional current flowing from the first primary junction 311 to the first intermediate junction 321 (labelled as $I_2$ in FIG. 2A) is therefore greater than the conventional current flowing from the first intermediate junction 321 to the second primary junction 312 (labelled as $I_3$ in FIG. 2A), and the conventional current flowing from the first primary junction 311 to the second intermediate junction 322 (labelled as $I_4$ in FIG. 2A) is smaller than the conventional current flowing from the second intermediate junction 322 to the second primary junction 312 (labelled as $I_5$ in FIG. 2A). In addition, the conventional current flowing from the first primary junction 311 to the third intermediate junction 323 (labelled as $I_7$ in FIG. 2A) is therefore greater than the conventional current flowing from the third intermediate junction 323 to the second primary junction 312 (labelled as $I_8$ in FIG. 2A).

The following analysis of the above scenario according to Kirchhoff's circuit laws is provided. A total current flowing out of the first primary junction 311 may be considered to be equal to a sum of $I_2$, $I_4$ and $I_7$. Conversely, a total current flowing into the second primary junction 312 may be considered to be equal to a sum of $I_3$, $I_5$ and $I_8$. A total current flowing into the first intermediate junction 321 is equal to $I_2$ whereas a total current flowing out of the first intermediate junction 321 is equal to a sum of $I_1$ and $I_3$. Therefore, $I_2=I_1+I_3+I_8$. Similarly, a total current flowing into the second intermediate junction 322 is equal to a sum of $I_1$, $I_4$ and $I_6$ whereas a total current flowing out of the second intermediate junction 322 is equal to $I_5$. Therefore, $I_5=I_1+I_4+I_6$. Consequently, the total current flowing out of the first primary junction 311 may be written as $I_1+I_3+I_4+I_6+I_8$ and the total current flowing into the second primary junction 312 may also be written as $I_1+I_3+I_4+I_6+I_8$. The positive differential current, $I_1$, is equal to one of the possible alignment currents referred to herein (e.g., a first alignment current), the additional positive differential current, $I_6$, is equal to another one of the alignment currents referred to herein (e.g., a second alignment current), whereas the conventional current flowing from the first primary junction 311 to the second intermediate junction 322, $I_4$, is equal to a first motor current, the conventional current flowing from the first intermediate junction 321 to the second primary junction 312, $I_3$, is equal to a second motor current, and the conventional current flowing from the third intermediate junction 323 to the second primary junction 312, $I_8$, is equal to a third motor current. The conventional current flowing from the second intermediate junction 322 to the second primary junction 312, $I_5$, is a result of a superimposition of the first motor current, $I_4$, the first alignment current, $I_1$ and the second alignment current, $I_6$, while the conventional current flowing from the first primary junction 311 to the first intermediate junction 321, $I_2$, is a result of a superimposition of the second motor current, $I_3$, and the first alignment current, $I_1$, and while the conventional current flowing from the first primary junction 311 to the third intermediate junction 323, $I_7$, is a result of a superimposition of the third motor current, $I_8$, and the second alignment current, $I_6$.

For this reason, the alignment current(s) have been described herein as flowing between the first primary junction 311 and the second primary junction 321 via at least one branch 341, 342, 343 of the plurality of branches 341, 342, 343. However, this should not be understood as requiring that the total current flowing between the first primary junction 311 and the second primary junction 321 must change in order for the alignment current(s) to flow. In particular, it may be that a respective motor current is reduced when an alignment current flows, such that the total current flowing between the first primary junction 311 and the second primary junction 321 does not change even when there is an alignment current. Accordingly, in the present disclosure, the alignment current is considered to be and described as a current which may be superimposed on a motor current along portions of a respective leg, such that the motor current is also considered to be constant along the respective leg 410, 420, 430 (e.g., on either side of the intermediate junctions 321, 322, 323), despite the total (i.e., superimposed) currents along the respective leg varying either side of a respective intermediate junction 321, 322, 323.

Nevertheless, in an equally correct but alternative conceptualization of the alignment current(s), alignment current (s) may be described as the current flowing across the at least one branch 341, 342, 343 of the plurality of branches 341, 342, 343. If so, the respective motor currents may be described as varying along the respective leg 410, 420, 430 (e.g., on either side of the intermediate junctions 321, 322, 323) corresponding to the addition of the respective alignment current that flows into or out of the respective intermediate junction 321, 322, 323 from or into the respective branch 341, 342, 343.

It may be that the electric machine 200, 200B, 200C comprises a plurality of active differential current sources, each of the active differential current sources being positioned on a respective branch 341-345. FIG. 2A shows a first example electrical topology for the first example electric machine 200 which comprises a first active differential current source 371 located on the first branch 341, a second active differential current source 372 positioned on the second branch 342 and a third active differential current source 373 positioned on the third branch 343. Each active differential current source 371-373 is configured to inject a respective differential current into each leg connected by the branch on which the respective actively differential current source is positioned. In the electrical topology of the first example electric machine 200 shown by FIG. 2A, the first active differential current source 371 is operable to inject a first active differential current into the first leg 410 or the second leg 420. The second active differential current source 372 is configured to inject a second active differential current into the second leg 420 or the third leg 430, and the third active differential current source 373 is able to inject a third active differential current into the third leg 430 or the first leg 410. As a result of conservation of electric charge, when each active differential current is injected into one of the legs connected by the respective branch, the active differential current is effectively drawn from the first primary junction 311 via the other leg connected by the respective branch.

By way of example, when the first active differential current source 371 injects the first active differential current into the first leg 410, the first active differential current is conducted from the first intermediate junction via the first-leg second coil 412 and the first-leg third coil 413 to the second primary junction 312. Accordingly, the first active differential current flows along the first alignment current path described above. Conversely, when the first active differential current source 371 injects the first active differential current into the second leg 420, the first active differential current flows along the second alignment current path. Consequently, in use, each active differential current forms at least a part of an alignment current which flows between the first primary junction 311 and the second primary junction 312 via the respective branch. In some operating conditions, it may be that the alignment current flowing along a given alignment current path only comprises the actively-instigated differential current provided by the respective active differential current source. In other operating conditions, the alignment current flowing along a given alignment current path may comprise both the actively-instigated differential current provided by the respective active differential current source and the passively-instigated differential current discussed above.

When the alignment current flows through at least one of the alignment current paths of the phase arrangement 300, 300B, 300C, an alignment component of the magnetic field is generated in addition to the motor component of the magnetic field generated as a result of the motor currents which flow through each leg previously described. The magnetic field generated by the coils may therefore be considered to comprise both the motor component and the alignment component. The rotor poles of the rotor 210 are responsive to the alignment component of the magnetic field produced by the coils such that a translational force is applied to the rotor 210 by the alignment component of the magnetic field generated by the coils when magnetised. As a result, the electric machine 200 is arranged so that the alignment current passing through at least one coil of each leg causes a translational force to be applied to the rotor 210 for maintaining alignment of the rotor 210 with respect to the stator 220 by means of the alignment component of the magnetic field produced by the coils as a consequence of the alignment current flowing therethrough.

The interaction between the rotor poles of the rotor 210 and the motor component of the magnetic field produced by the coils is not adversely affected by the presence of the alignment component of the magnetic field, such that the alignment current does not cause any significant alteration in the torque which is caused to be applied to the rotor 210 as a result of the motor currents flowing between the primary junctions 311, 312. In particular, no substantial torque is caused to be applied to the rotor 210 as a result of the alignment current flowing along the branch 341.

The translational force associated with the alignment current generally results in a translation in the opposite direction to the direction in which the rotor 210 has been translated away from the centre of the stator and towards the respective stator tooth. The translational force may act in a direction which opposes rotation of a central axis 209 of the rotor 210 around a geometrical centre of the stator 220 (similar to the central axis 209 orbiting the geometrical centre of the stator 220), the action of which may realign the central axis 209 of the rotor 210 with the geometrical centre of the stator 220 as such rotation progresses. In addition, a magnitude of the alignment current is a consequence of a magnitude of the potential difference between the intermediate junctions, which is in turn dependent on a magnitude of the changes in impedance of the respective coils brought about by a change in the proximity of the rotor poles of the rotor 210 to the respective coils. As a result, a magnitude of the translational force is dependent on a magnitude of the displacement of the rotor 210 away from the centre of the stator 220 and toward the respective stator tooth. In this way, the translational force associated with the alignment current is broadly proportional to the displacement of the rotor 210 away from the centre of the stator 220.

In addition to the plurality of active different current sources, the electric machine 200, 200B, 200C may also comprise a controller 390 and a sensor arrangement 392. The sensor arrangement 392 is generally configured to monitor a translational position of the rotor 210 with respect to the stator 220 and to monitor a rotational speed of the rotor 210. For the purpose of monitoring the translational position of the rotor 210, the sensor arrangement 392 may include, for example, two position sensors located at orthogonal positions, each position sensor being configured to output a signal corresponding to the translational displacement of the rotor 210 in mutually perpendicular directions. For example, the first position sensor may be configured to monitor the displacement of the rotor 210 in a direction parallel to the arrow 202 (which may be referred to as a y-direction) and the second position sensor may be configured to monitor the displacement of the rotor 210 in a direction parallel to the arrow 204 (which may be referred to as an x-direction). Otherwise, suitable sensor types for monitoring the position of the rotor 210 and/or the rotational speed of the rotor 220 will be apparent to those skilled in the art.

Based on the monitored translational position of the rotor 210, the monitored rotational speed of the rotor 210 and the magnitude of the motor currents flowing between the primary junctions 311, 312, the controller 390 calculates a magnitude and a direction of a required resultant force for translating the central axis of the rotor 210 back to the centre of the stator 220. The magnitude and the direction of the required resultant force dictates into which alignment current path an actively instigated differential current is required to flow as well as the magnitude of each actively-instigated differential current in the respective alignment current path in order for the central axis 201 of the rotor to be returned to the centre of the stator 220. The controller 390 then regulates the magnitude of the respective actively-instigated differential current injected by each of the plurality of active differential current sources 371-373 based on the determined magnitude and direction of the force to provide the required actively-instigated differential currents and thereby maintain alignment of the rotor 210 with respect to the stator 220. As a result, the electric machine 200, 200B, 200C is able to effectively maintain alignment of the rotor 210 with respect to the stator 220 by means of the plurality of active current sources 371-373.

The electrical machine 200 is therefore able to provide a translational force to the rotor 210 when the rotor 210 is brought out of alignment (i.e., misaligned) with the centre of the stator 220 by, for instance, an external force. The external force may originate from, for example, the mechanical system to which the rotor 210 is configured to be coupled. The external force may rapidly vary in time such that the rotor 210 is subject to oscillatory translation (that is, is subject to vibration). In particular, it may be that the rotor 210 is prone to vibrate excessively at specific rotational speeds of the rotor 210 (referred to as critical speeds), which if unmitigated, may cause damage to the electric machine 200 and/or the mechanical system. However, the translational force associated with the alignment current may act to reduce displacement of the rotor 210 away from the centre of the stator 220 and thereby dampens oscillatory translation (i.e., vibration) of the rotor 210. This improves mechanical performance of the electrical machine 200 and reduces a likelihood of damage to the electrical machine 200 itself or to a mechanical system to which the rotor 210 is coupled during operation. In other words, the electric machine 200 can function as if it contained a contactless bearing which maintains alignment of the rotor 210 with respect to the stator 200 in use, the contactless bearing function being provided by an interaction between the alignment component of the magnetic field and the rotor poles of the rotor 210. Advantageously, this function is achieved without requiring separate sets of coils for the purpose of applying translational force and torque, respectively, to the rotor 210. The present disclosure therefore refers to the current which provides the translational force as an alignment current.

In the phase arrangement 300, 300B, 300C, each intermediate junction is located so that, in each leg, a total number of turns of the or each coil connected in series between the first primary junction 311 and the respective intermediate junction is equal to a total number of turns of the or each coil connected in series between the respective intermediate junction and the second primary junction 312. Because the electrical impedance (e.g., inductance) of each coil is dependent on the number of turns of the respective coil, applying this criterion to the phase arrangement 300, 300B, 200C ensures that when the rotor 210 is aligned with the stator 220, the impedance of each of the coils is equal and the bridge circuit is correctly balanced and that when the rotor 210 is misaligned with the stator 200, the magnitude of the change of impedance of each of the coils of each leg 410-430 corresponds to the magnitude of the displacement of the central axis 201 of the rotor 210. As a result, the magnitude of the potential difference between the intermediate junctions which arises as a result of the change in the magnitude of the impedance of the coils corresponds to the displacement of the central axis 201 of the rotor 210. It follows that the magnitude of the passively-instigated differential current which flows along a given alignment current path being directly corresponds to the magnitude of the displacement of the central axis 201 of the rotor 210. Therefore, the magnitude of the translational force applied to the rotor 210 by the alignment component of the magnetic field generated by the coils as a result of the passively-instigated differential current corresponds to the displacement of the rotor 210 with respect to the stator 220. The application of this criterion therefore ensures that the translational force applied to the rotor 210 as a consequence of the passively-instigated differential current is a translational force suitable for maintaining alignment of the rotor 210 with respect to the stator 220.

When applied to the electrical topologies of the first electrical machine 200 shown by FIGS. 2A and 2B, this criterion requires that, in each leg 410-430, the number of turns of each of the first coils 411, 421, 431 is equal to a sum of the number of turns of the second coils 412, 422, 432 and third coils 413, 423, 433. Equally, when applied to the electrical topology of the second electrical machine 200B shown by FIG. 4, this criterion requires that, in each leg 410-450, the number of turns of each of the first coils 411, 421, 431, 441, 451 is equal to a sum of the number of turns of the second coils 412, 422, 432, 442, 452 and third coils 413, 423, 433, 443, 453. In turn, when applied to the first example electrical topology of the third example electrical machine 200C shown by FIG. 6A, this criterion requires that, in each leg 410-450, the number of turns of each of the first coils 411, 421, 431, 441, 451 is equal to a sum of the number of turns of the second coils 412, 422, 432, 442, 452, the third coils 413, 423, 433, 443, 453, the fourth coils 414, 424, 434, 444, 454 and the fifth coils 415, 425, 435, 445, 455. However, when applied to the second example electrical topology of the third example electrical machine 200C shown by FIG. 6B, this criterion requires that, in each leg 410-450, a sum of the number of turns of each of the first coils 411, 421, 431, 441, 451 and the second coils 412, 422, 432, 442, 452 coils is equal to a sum of the number of turns of the third coils 413, 423, 433, 443, 453, the fourth coils 414, 424, 434, 444, 454 and the fifth coils 415, 425, 435, 445, 455.

For ease of visualisation, each coil is shown as being radially offset from each other coil which forms part of the same stator tooth 221, 222, 223 in FIG. 3. However, preferably each coil is intertwined with each other coil which forms part of the same stator tooth 221, 222, 223 such that each coil which forms a part of each stator tooth 221, 222, 223 is defined by approximately the same characteristic distance to the centre of the stator 220. If so, it follows that a mean average characteristic distance to the centre of the stator 220 of each of the coils in the first leg 410 is approximately equal to a mean average characteristic distance to the centre of the stator 220 of each of the coils in the second leg 420. More generally, in each leg, a mean average characteristic distance to the centre of the stator 220 of each of the coils is approximately equal to a mean average characteristic distance to the centre of the stator 220 of each of the coils in each other leg. This ensures that when the rotor 210 is aligned with the stator 220, the impedance of each of the coils is equal and the bridge circuit is correctly balanced and that when the rotor 210 is misaligned with the stator 200, the magnitude of the change of impedance of each of the coils of each leg corresponds to the magnitude of the displacement of the rotor 210 (and therefore the magnitude of the passively-instigated differential current which flows along a given alignment current path being directly corresponds to the magnitude of the displacement of the central axis 201 of the rotor 210). The same principle applies to the further embodiments described herein.

Instead of the plurality of active differential current sources 371-373, the electric machine 200, 200B, 200C may comprise a plurality of negative impedance converters (which may otherwise be referred to as a negative impedor), each of the plurality of negative impedance converters being positioned on a respective branch 341-345. FIG. 2B shows a second example electrical topology for the first example electric machine 200 which comprises a first negative impedance converter 351 located on the first branch 341, a second negative impedance converter 352 positioned on the second branch 342 and a third negative impedance converter 353 positioned on the third branch 343. In contrast to the delta arrangement of the branches 341-343 shown in FIG. 2A, the branches 341-343 shown in FIG. 2B are connected to each other to form a star arrangement, as will be understood by those skilled in the art. Each negative impedance converter 351-353 may also be referred to as a negative impedance device or a negative impedance converter. Each negative impedance converter 351-353 is an active component which is configured to add a negative electrical impedance to each alignment current path by introducing or injecting additional electrical energy into one of the alignment current paths, depending on whether the alignment current is flowing through the first alignment current path or the second alignment current path as appropriate. Each negative impedance converter may be configured to add either an effective negative electrical resistance into one of the alignment current paths, an effective negative electrical reactance into one of the alignment current paths or both an effective negative electrical resistance and an effective negative electrical reactance into one of the alignment current paths. Accordingly, each negative impedance converter 351-

353 may function as either a negative resistor, a negative inductor or a combination of a negative resistor and a negative inductor.

The negative impedance converters 351-353 are collectively configured to reduce an overall impedance of each alignment current path by adding a negative electrical impedance to the positive impedance of the alignment current path. As discussed above, the coils are generally configured to generate a magnetic field when a magnetising electric current is conducted therethrough. For this reason, each coil may generally have a substantial positive impedance (e.g., resistance and/or inductance) due to, for instance, a large number of turns of the coil required to produce a sufficiently large magnetic field for driving the rotor 210. In a previously-considered electric machine, the positive impedance of the alignment current path provided by the coils limits the magnitude of the passively-instigated differential current between respective intermediate junctions such that the magnitude of the translational force applied to the rotor 210 for maintaining alignment of the rotor 210 with respect to the stator 220 is correspondingly limited. In contrast, the electric machine 200 of the present disclosure ensures that the magnitude of the translational force applied to the rotor 210 is sufficient to overcome an external force applied to the rotor 210 and thereby return the central axis 201 of the rotor 210 toward a position which is closer to the centre of the stator 220 by making use of the negative impedance converter 351-353 to reduce the total impedance of the alignment current path and thereby aid the flow of the passively-instigated differential current between respective intermediate junctions 321-323. Consequently, the electric machine 200 is able to more effectively maintain alignment of the rotor 210 with respect to the stator 220 and/or more effectively dampen any vibration of the rotor 210 in use.

Each negative impedance converter 351-353 may comprise, for instance, an operational-amplifier circuit as described in H. Ma and B. Yan, "Nonlinear damping and mass effects of electromagnetic shunt damping for enhanced nonlinear vibration isolation," Mechanical Systems and Signal Processing, vol. 146, p. 107010, 2021 or X. Zhang, H. Niu and B. Yan, "A novel multimode negative inductance negative resistance shunted electromagnetic damping and its application on a cantilever plate," Journal of Sound and Vibration, vol. 331, No. 10, pp. 2257-2271, 2012. Such operational-amplifier circuits provide a simple and robust implementation of the negative impedance converters 351-353. Additionally, such operational-amplifier circuits enable a magnitude of the effective negative impedance of each negative impedance converter 351-353 to be controlled by controlling the additional electrical energy introduced to the alignment current path by the respective negative impedance converter 351-353. Otherwise, each negative impedance converter 351-353 may have another suitable electrical topology as discussed below with reference to FIG. 8.

Figure 8:
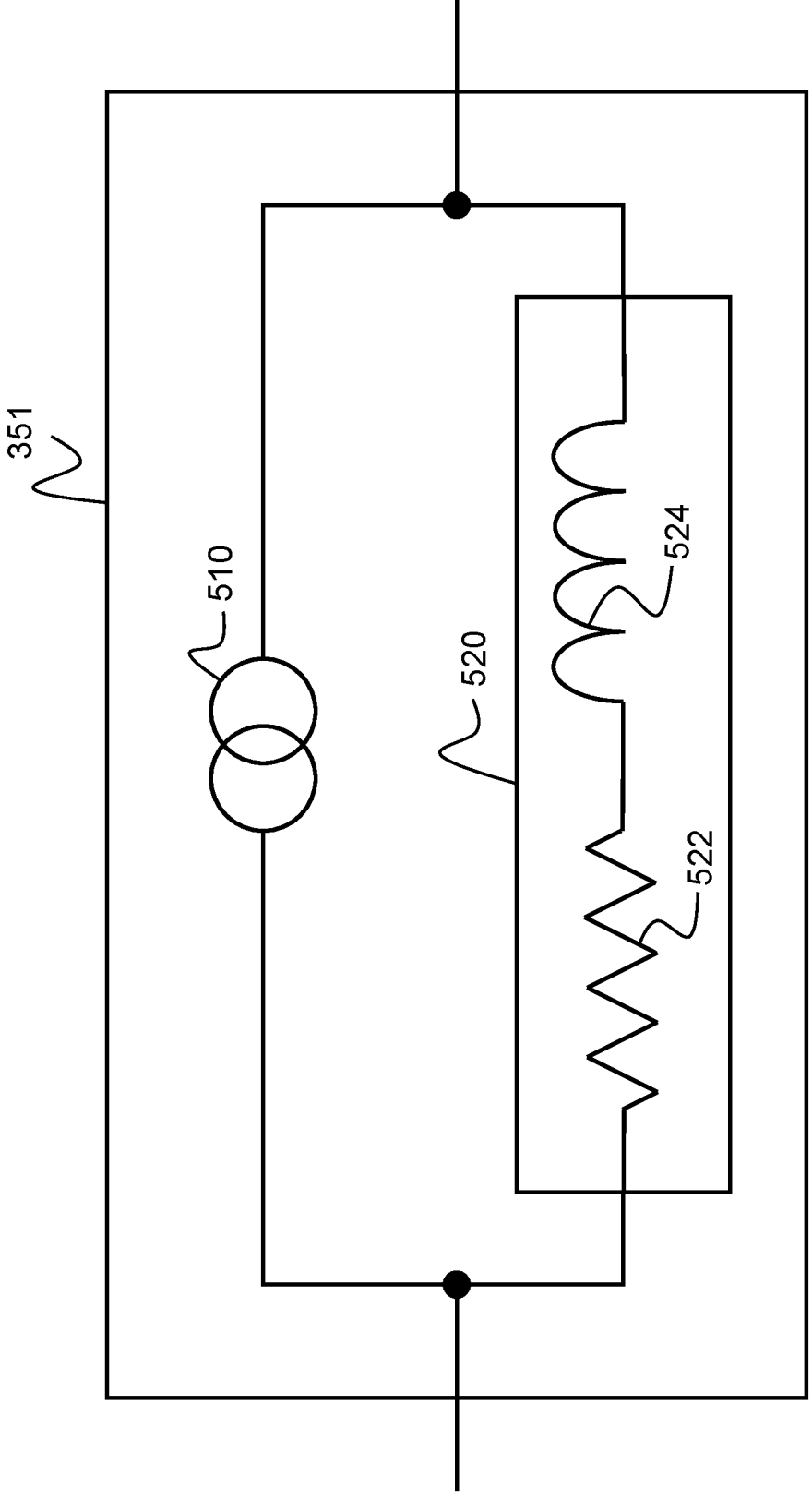
FIG. 8 is a circuit diagram which shows an internal electrical topology of an example negative impedance converter.

FIG. 8 is a circuit diagram which shows an internal electrical topology of an example negative impedance converter 351 comprising a current source 510 and a ballast impedance converter 520 connected in parallel at a first junction 511 and a second junction 512. In turn, the ballast impedance converter 520 comprises a ballast resistor 522 and a ballast inductor 524 connected in series. The internal electrical topology of the example negative impedance converter 351 may be applied to each negative impedance converter 351-353 of the plurality of negative impedance converters 351-353 discussed above.

For the purpose of the following discussion, the negative impedance converter 351 is considered to have a total effective impedance denoted by $Z_t$, a net total current passing out of the negative impedance converter is considered to be $I_t$ and a voltage change across the negative impedance converter 351 is represented by V. Similarly, the ballast impedance converter 520 has a ballast impedance $Z_b$ and a current passing through the ballast impedance converter is labelled as $I_b$. Finally, an electric current provided by the current source 510 is denoted by $I_s$. By analysing the current flows in and out of the second junction 512 using Kirchhoff's current law, it is apparent that $I_s=I_t+I_b$. After applying Ohm's law to the right hand side of this equation, this may then be expressed as $I_s=(V/Z_t)+(V/Z_b)$. Using this equation, the magnitude of the electric current provided by the current source 510 required to achieve a total effective impedance of $-Z_t$ may be determined. Accordingly, by varying the magnitude of the electric current provided by the current source 510, the magnitude of the effective negative impedance added to the alignment current path by the negative impedance converter 351 may be controlled.

Preferably, the current source 510 comprises a switched-mode power-electronic drive. Such an arrangement provides an especially energy efficient current source 510 for incorporation within the negative impedance converter 351, which in turn improves an energy efficiency of the electric machine 200. However, such arrangements may increase a complexity of the negative impedance converter 351 compared to, for instance, a negative impedance converter 351 comprising an operational-amplifier circuit as discussed above. Nevertheless, in various applications of the electric machine 200 where energy efficiency is highly advantageous (such as in the context of aircraft and aircraft propulsion systems), the benefits provided by an improved energy efficiency of the electric machine 200 outweigh any drawbacks associated with the increased complexity of the electric machine 200.

Returning now to FIGS. 2B and 3, each negative impedance converter 351-353 may be configured to control the additional energy introduced to the alignment current path such that the magnitude of the effective negative impedance added to the alignment current path by the respective negative impedance converter 351-353 is less than a magnitude of the total positive electrical impedance of the alignment current path. As a result, the magnitude of the effective negative impedance added to the alignment current path by the respective negative impedance converter 351-353 is never greater than the total positive impedance of the alignment current path, which would result in the overall electrical impedance of the alignment current path being negative. If this were the case, the respective negative impedance converter 351-353 would immediately begin providing an incrementally increasing amount of electrical energy to the alignment current path as soon as a potential difference between the respective intermediate junctions 321-323 arose, which would cause the respective negative impedance converter 351-353 to rapidly reach and operate at a maximum power-rating whenever an alignment current flowed across the branch 341-343 due to the potential difference between the respective intermediate junctions 321-323. This is associated with various disadvantages, including a reduced energy efficiency of the electrical machine 200 and a reduced mean time between failures (MTBF) of the negative impedance converter 351-353.

Each negative impedance converter 351-353 may also be configured to control the additional electrical energy introduced to the alignment current path such that the magnitude of the negative electrical impedance added to the alignment current path by the respective negative impedance converter 351-353 is equal to a target value. The target value may be chosen to ensure that the overall impedance of the alignment current path is sufficiently low such that the potential difference which arises between the respective intermediate junctions 321-323 results in a sufficiently large current flowing across the respective branch 341-343 which in turn causes the application of a translational force to the rotor 210 of sufficient strength for maintaining alignment of the rotor 210 with respect to the stator 220. The target value may also be chosen to ensure that a safety margin between the magnitude of the negative electrical impedance added to the alignment current path by the negative impedance converter 351-353 and the magnitude of the total positive impedance of the alignment current path is maintained. In particular, the target value may be expressed as a fraction of the total positive impedance of the alignment current path. For example, the target value may be between 70% and 99% of the total positive impedance of the alignment current path. Preferably, the target value may be between 90% and 99% of the total positive impedance of the alignment current path. More preferably, the target value may be approximately 95% of the total positive impedance of the alignment current path such that the magnitude of the negative electrical impedance added to the alignment current path by each negative impedance converter 351-353 is no greater than 95% of the magnitude of the total positive electrical impedance of the alignment current path. This provides a simple, precise and effective control regime for each negative impedance converter 351-353 in use.

The negative impedance converter may comprise or be configured to access a memory which stores a predetermined value for the total positive impedance of the alignment current path based on the theoretically or experimentally assessed impedance values of each of the coils at particular rated conditions, along with similar impedance values for any other components of the alignment current path. Each negative impedance converter 351-353 may control (and be configured to control) the additional energy introduced to the alignment current path based on the stored predetermined total positive impedance value of the alignment current path to achieve the control objectives outlined above. The negative impedance converter 350 may comprise any suitable processing circuitry and machine-readable instructions for reading the predetermined total positive impedance value and responsively performing the associated control.

The electric machine 200 may further comprise a monitoring arrangement 391 which is configured to determine the total positive electrical impedance of each alignment current path. The total positive impedance of each alignment current path is equal to the total equivalent series impedance of the phase arrangement 300, 300' between the first primary junction 311 and the second primary junction 312 if the respective negative impedance converter 351-353 were not present. Each negative impedance converter 351-353 may control the additional electrical energy introduced to the alignment current path at the respective intermediate junctions 321-323 based on the determined positive electrical impedance of the alignment current path. This arrangement provides that each negative impedance converter 351-353 is able to effectively control the magnitude of the negative electrical impedance added to the alignment current path so that the magnitude of the negative electrical impedance introduced to the alignment current path is always less than the magnitude of the total positive electrical impedance of the alignment current path, and optionally is always equal to the predetermined target value, across a wide range of operating states of the electrical machine 200.

The total positive electrical impedance of each alignment current path may vary according to an operating state of the electrical machine 200. In particular, it may be that the electrical resistance of the coils is primarily dependent on the temperature of the coils. For example, for coils which are formed using copper as the electrically conductive material, the resistance of the coils may change by approximately a factor of 2 as the temperature of the coils varies by 100° C. The electrical inductance of the coils may also be temperature dependent, albeit to a lesser extent than the electrical resistance of the coils. The temperature of the coils is generally related to resistive heat dissipation within the phase arrangement as a result of the motor current(s) through them, which typically have a significantly larger magnitude than the alignment current as described above. It follows that when the magnitude of the motor currents is increased (such as when the torque applied to the rotor 210 is increased), the temperature of the coils also increases. In typical use, the resistive heat dissipation associated with the motor currents may cause the variation in the temperature of the coils to be sufficiently large so that the related variation of the impedance of the coils is significant.

The monitoring arrangement 391 may determine the total positive impedance of each alignment current path by directly monitoring the impedance of each leg or each coil. Otherwise, the monitoring arrangement 391 may determine the total positive impedance of each alignment current path by monitoring a temperature of the electric machine 200 and subsequently evaluating a mathematical relationship between the temperature of the electric machine 200 and the positive impedance of each alignment current path. The temperature of the electric machine 200 is generally representative of the temperature of the coils, and may be a temperature of any of the coils themselves or it may be a temperature of the stator teeth 221-225 which is directly related to the temperature of the coils, or a thermally coupled component. The mathematical relationship may take the form of an analytical relationship or a numerical relationship. The analytical relationship may take the form of an algebraic equation. The numerical relationship may be represented by a look-up table or similar stored in a memory of the monitoring arrangement 391, such that the monitoring arrangement 391 is able to reference the look-up table so as to determine the positive impedance of each alignment current path based on the monitored temperature of the electrical machine 200.

Figure 9:
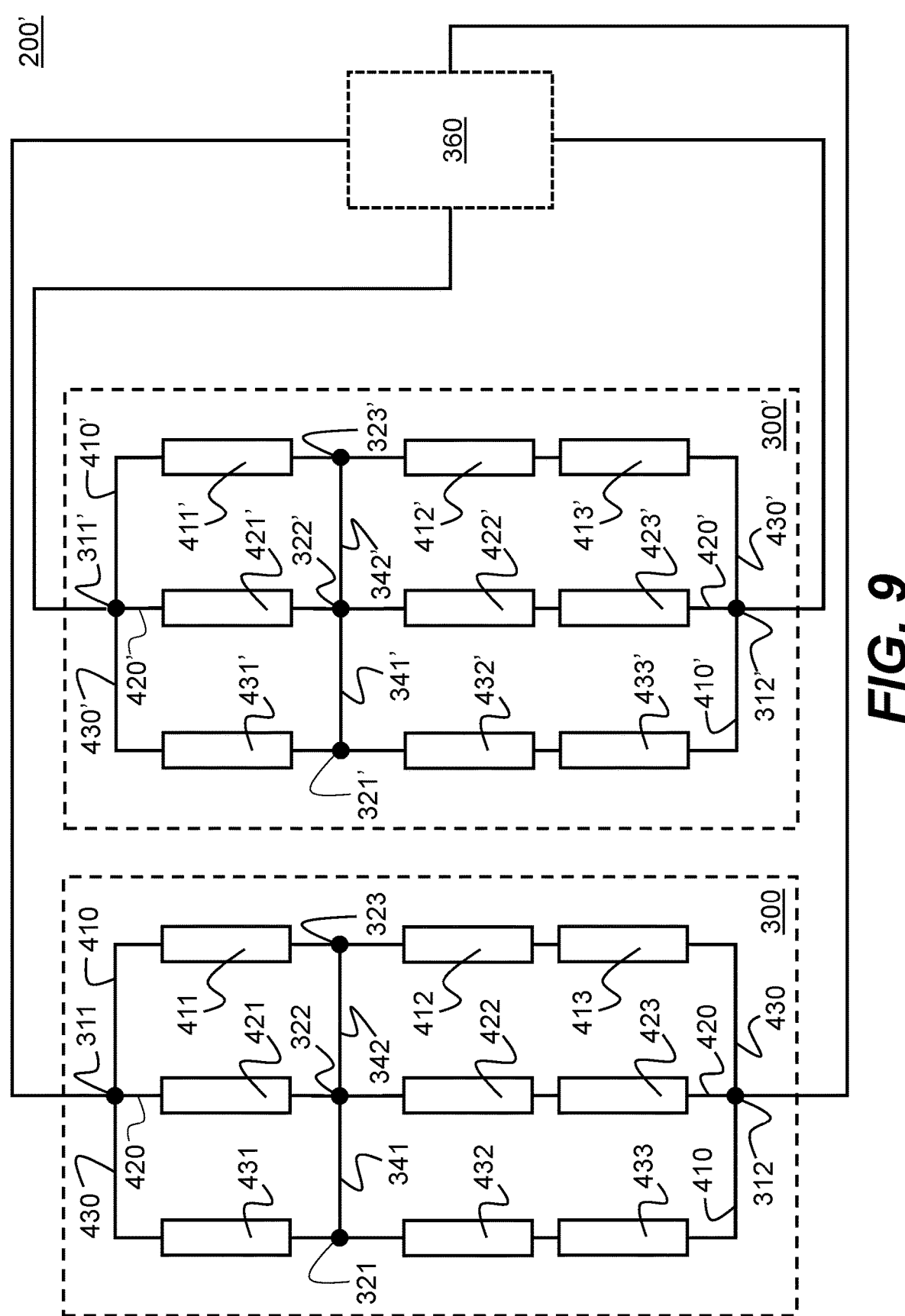
FIG. 9 is a circuit diagram which shows an electrical topology of a fourth example electric machine.
Figure 10:
FIG. 10 shows a cross-sectional view of the fourth example electric machine.

FIG. 9 is a circuit diagram which shows an electrical topology of a fourth example rotary electric machine 200'. FIG. 10 shows a schematic cross-sectional view of the fourth example rotary electric machine 200'. Components of the electric machine 200' will be described with reference to both FIGS. 9 and 10. The fourth example electric machine 200' is generally similar to the first example electric machine 200 described above with reference to FIGS. 2A-2B and 3, with like reference signs indicating common or similar features. Nevertheless, it should be appreciated that the fourth electrical machine 200' may have any of the features described above with respect to the first electrical machine 200 even if these features are not shown on FIGS. 9 and 10. However, in the fourth example electric machine 200', the phase arrangement 300 is a first phase arrangement 300 and the electric machine 200' further comprises a second phase arrangement 300' such that the electric machine 200' comprises a plurality of phase arrangements 300, 300'. The second phase arrangement 300' is similar to the first phase arrangement 300, with common or similar features being indicated by corresponding reference numerals distinguished by the prime symbol ('). Collectively, the first phase arrangement 300 and the second phase arrangement 300' may be referred to as a winding of the electric machine 200'.

In addition, in the example of FIGS. 9 and 10, the set of stator teeth 221, 222, 223 is a first set of stator teeth 221, 222, 223 and the electric machine 200' also comprises a second set of stator teeth 221', 222' 223' such that the electric machine 200' comprises a plurality of sets of stator teeth. The second set of stator teeth 221'-223' is similar to the first set of stator teeth 221-223 with common or similar features also being indicated by corresponding reference numerals distinguished by the prime symbol ('). Each set of stator teeth 221-223, 221'-223' is radially offset with respect to each other set of stator teeth 221-223, 221'-223' around the rotor 210. Each of the plurality of sets of stator teeth 221-223, 221'-223' is provided with a respective phase arrangement 300, 300' of the plurality of phase arrangements 300, 300'.

The input system 360 is electrically connected to the first primary junction 311 and the second primary junction 312 of the first-leg first phase arrangement 300 as well as the first primary junction 311' and the second primary junction 312' of the first-leg second phase arrangement 300'. The input system 360 is configured to provide a first AC input voltage to the primary junctions 311, 312 of the first-leg first phase arrangement 300 and to provide a second AC input voltage to the primary junctions 311', 312' of the first-leg second phase arrangement 300'.

In particular, the input system 360 shown in FIG. 9 is provided with four separate terminals. Therefore, the input system 360 may be operated so that a phase of the first AC input voltage is different to a phase of the second AC input voltage. Consequently, the electric machine 200' may be operated as a two-phase electric machine. However, it will be appreciated that the electric machine 200' may comprise any suitable number of phase arrangements in the manner described above, and the input system 360 may be provided with an appropriate number of terminals such that the input system 360 is electrically connected to the first primary junction and the second primary junction of each phase arrangement such that the electric machine 200' is operable as a polyphase electric machine. As an example, the electric machine may comprise three phase arrangements, and the input system 360 may be provided with three separate terminals such that the electric machine 200 may be operated as a three-phase electric machine. Operation of the electric machine 200' as a polyphase electric machine may enable smoother and/or more consistent mechanical power transfer to a mechanical system which is coupled to the rotor 210 as the rotor 210 rotates relative to the stator 220 relative to the central axis 201.

Although it has been described that each coil is wound around a respective stator tooth (or plurality of stator teeth), the disclosure envisages implementations in which this is not the case. For example, it may be that each coil is wound around a magnetic material within the respective stator tooth (or plurality of stator teeth), such that each coil is disposed within the respective stator tooth (or plurality of stator teeth) and that each coil is arranged coaxially with each other coil which forms part of the same stator tooth.

Additionally, while it has been described that the first example electric machine 200 may comprise a plurality of active differential current sources or a plurality of negative impedance converters, it may be that any of the electric machines described herein do not comprise either a plurality of active differential current sources or a plurality of negative impedance converters.

Further, while the fourth electrical machine 200' has been described as being generally similar to the first electrical machine 200, it should be appreciated that the principles described in respect of the fourth electrical machine 200' may be applied, mutatis mutandis, to the second electrical machine 200B and the third electrical machine 200C described above with reference to FIGS. 4 to 7.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

The invention claimed is:

1. An electric machine comprising a stator, a rotor configured to rotate relative to the stator, the stator having a phase arrangement, wherein:

the phase arrangement includes a number of legs connected in parallel at a first primary junction and a second primary junction, the number of legs being an integer greater than two;

each leg includes a plurality of coils connected in series through a respective intermediate junction, each coil comprising a number of turns;

each leg is connected to at least one other leg of the legs by a branch at the respective intermediate junctions such that the phase arrangement is in the form a bridge circuit;

the phase arrangement is configured to conduct, through each leg, a motor current through the respective series coils between the first primary junction and the second primary junction;

the phase arrangement is configured to permit an alignment current to flow between the first primary junction and the second primary junction along an alignment current path which passes through at least one coil of two different legs of the number of legs via a respective branch; and the electric machine is configured so that:

the motor currents cause a torque to be applied to the rotor for rotation relative to the stator, and the alignment current causes a translational force to be applied to the rotor.

2. The electric machine of claim 1, wherein the phase arrangement is arranged such that an increase in the alignment current does not alter a torque which is caused to be applied to the rotor by the motor currents.

3. The electric machine of claim 1, wherein:

the stator comprises a set of stator teeth, each stator tooth of the set being equally angularly distributed around a circumference of stator, wherein a number of stator teeth within the set of stator teeth is equal to or greater than the number of legs of the phase arrangement;

in each leg, each coil forms part of a different stator tooth coil-grouping;

each stator tooth coil-grouping is provided to at least one stator tooth of the set of stator teeth; and each intermediate junction is located such that, in each leg, a total number of turns of the or each coil connected in series between the first primary junction and the respective intermediate junction is equal to a total number of turns of the or each coil connected in series between the respective intermediate junction and the second primary junction.

4. The electric machine of claim 3, wherein each coil which forms part of a respective stator tooth coil-grouping is arranged coaxially with each other coil which forms part of the same stator tooth coil-grouping.

5. The electric machine of claim 4, wherein:

each coil is defined by a characteristic distance to the centre of the stator measured from a geometrical centre of the respective coil;

in each leg, a mean characteristic distance to the centre of the stator of each of the coils in the respective leg is equal to a mean characteristic distance to the centre of the stator of each of the coils in each other leg.

6. The electric machine of claim 3, wherein each stator tooth comprises a soft magnetic material.

7. The electric machine of claim 3, wherein each coil is wound around the at least one stator tooth to which it is provided.

8. The electric machine of claim 1, further comprising a plurality of active differential current sources, each active differential current source being positioned on a respective branch and configured to inject an actively-instigated differential current into each leg connected by the respective branch, wherein the respective actively-instigated differential current forms part of an alignment current which flows between the first primary junction and the second primary junction via the respective branch.

9. The electric machine of claim 8, further comprising:

a sensor arrangement configured to:

monitor a translational position of the rotor with respect to the stator, and monitor a rotational speed of the rotor; and a controller configured to:

determine a magnitude and a direction of a force required to maintain alignment of the rotor with respect to the stator based on the monitored translational position of the rotor, the monitored rotational speed of the rotor and a magnitude of the motor currents; and regulate a magnitude of the active differential current injected by each of the plurality of active differential current sources based on the determined magnitude and direction of the force.

10. The electric machine of claim 1, further comprising a plurality of negative impedance converters, each positioned on a respective branch, wherein:

each alignment current path has a positive electrical impedance provided by the coils of each leg; and each negative impedance converter is configured to add a negative electrical impedance to one of the alignment current paths by introducing additional electrical energy into the alignment current path.

11. The electric machine of claim 1, further comprising an input system configured to provide an alternating-current voltage to the phase arrangement.

12. The electric machine of claim 1, wherein:

the stator comprises a plurality of sets of stator teeth;

each set of stator teeth is radially offset with respect to each other around the rotor;

the stator includes a plurality of the phase arrangements, each respective one of the phase arrangements being provided to a respective set of stator teeth;

for each set of stator teeth:

each stator tooth of the set is equally angularly distrib- ₅ uted around a circumference of stator, wherein a number of stator teeth within the set of stator teeth is equal to or greater than the number of legs of the phase arrangement;

in each leg, each coil forms part of a different stator ₁₀ tooth coil-grouping;

each stator tooth coil-grouping is provided to at least one stator tooth of the set of stator teeth; and each intermediate junction is located such that, in each leg, a total number of turns of the or each coil ₁₅ connected in series between the first primary junction and the respective intermediate junction is equal to a total number of turns of the or each coil connected in series between the respective intermediate junction and the second primary junction. ₂₀

13. The electric machine of claim 12, further comprising an input system configured to provide a respective alternating-current voltage to each phase arrangement, each alternating-current voltage having a different phase.

14. The electric machine of claim 1, wherein the number ₂₅ of legs is an odd integer.

15. A gas turbine engine comprising the electric machine of claim 1, wherein the rotor of the electric machine is mechanically coupled to a spool of the gas turbine engine.

16. The gas turbine engine of claim 15, wherein the rotor ₃₀ of the electric machine is arranged coaxially with the spool of the gas turbine engine.

\* \* \* \* \*